United States Patent
Abe et al.

(10) Patent No.: US 12,187,643 B2
(45) Date of Patent: Jan. 7, 2025

(54) GETTER MATERIAL, METHOD FOR MANUFACTURING GETTER MATERIAL, METHOD FOR MANUFACTURING GETTER-MATERIAL-CONTAINING COMPOSITION, AND METHOD FOR MANUFACTURING GLASS PANEL UNIT

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Tasuku Ishibashi, Ishikawa (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1031 days.

(21) Appl. No.: 17/041,873

(22) PCT Filed: Mar. 15, 2019

(86) PCT No.: PCT/JP2019/010874
§ 371 (c)(1),
(2) Date: Sep. 25, 2020

(87) PCT Pub. No.: WO2019/188424
PCT Pub. Date: Oct. 3, 2019

(65) Prior Publication Data
US 2021/0009471 A1  Jan. 14, 2021

(30) Foreign Application Priority Data
Mar. 30, 2018 (JP) .................. 2018-069724

(51) Int. Cl.
*C03C 27/06* (2006.01)
*B01J 20/00* (2006.01)
(Continued)

(52) U.S. Cl.
CPC ............. *C03C 27/06* (2013.01); *B01J 20/183* (2013.01); *B01J 20/3078* (2013.01)

(58) Field of Classification Search
CPC ...... C03C 27/06; B01J 20/183; B01J 20/3078
See application file for complete search history.

(56) References Cited

U.S. PATENT DOCUMENTS 5,314,853 A  5/1994 Sharma
2005/0238803 A1  10/2005 Tremel et al.
(Continued)

FOREIGN PATENT DOCUMENTS

EP  1 745 845 A1  1/2007
EP  3 202 725 A1  9/2017
(Continued)

OTHER PUBLICATIONS

International Search Report and Written Opinion issued in International Patent Application No. PCT/JP2019/010874, dated Jun. 18, 2019; with partial English translation.
(Continued)

*Primary Examiner* — Linda L Gray
(74) *Attorney, Agent, or Firm* — Rimon P.C.

(57) ABSTRACT

A method for manufacturing a glass panel unit, which reduces the amount of a getter material to enable a gettering ability to be realized at a relatively low temperature less likely to cause damage. The method includes a step of producing a getter material by heating an unprocessed getter material at a temperature higher than a prescribed temperature Te; a step of producing a preassembled component including a first and second glass pane, a heat-fusible sealing
(Continued)

material, an internal space, and a gas adsorbent containing the getter material, and an evacuation port; a step of forming a frame body hermetically bonding the first glass pane and the second glass pane together by melting the heat-fusible sealing material with heat; and a step of heating the gas adsorbent at the prescribed temperature Te while the internal space is evacuated by exhausting air in the internal space through the evacuation port.

3 Claims, 10 Drawing Sheets

(51) Int. Cl.
*B01J 20/18* (2006.01)
*B01J 20/30* (2006.01)

(56) References Cited

U.S. PATENT DOCUMENTS

| | | |
|---|---|---|
| 2007/0013305 A1 | 1/2007 | Wang et al. |
| 2009/0263587 A1 | 10/2009 | Wang et al. |
| 2010/0136239 A1 | 6/2010 | Wang et al. |
| 2017/0210667 A1 | 7/2017 | Abe et al. |
| 2019/0195003 A1 | 6/2019 | Abe et al. |

FOREIGN PATENT DOCUMENTS

| | | |
|---|---|---|
| JP | 2007-511102 A | 4/2007 |
| JP | 2016-069232 A | 5/2016 |
| WO | 2010/021127 A1 | 2/2010 |
| WO | 2018/043376 A1 | 3/2018 |
| WO | 2019/004135 A1 | 1/2019 |

OTHER PUBLICATIONS

Extended European Search Report issued for the corresponding European patent application No. 19776341.0, dated Jul. 30, 2021.
Supplementary Partial European Search Report dated Apr. 19, 2021, issued in corresponding European Patent Application No. 19776341.0.

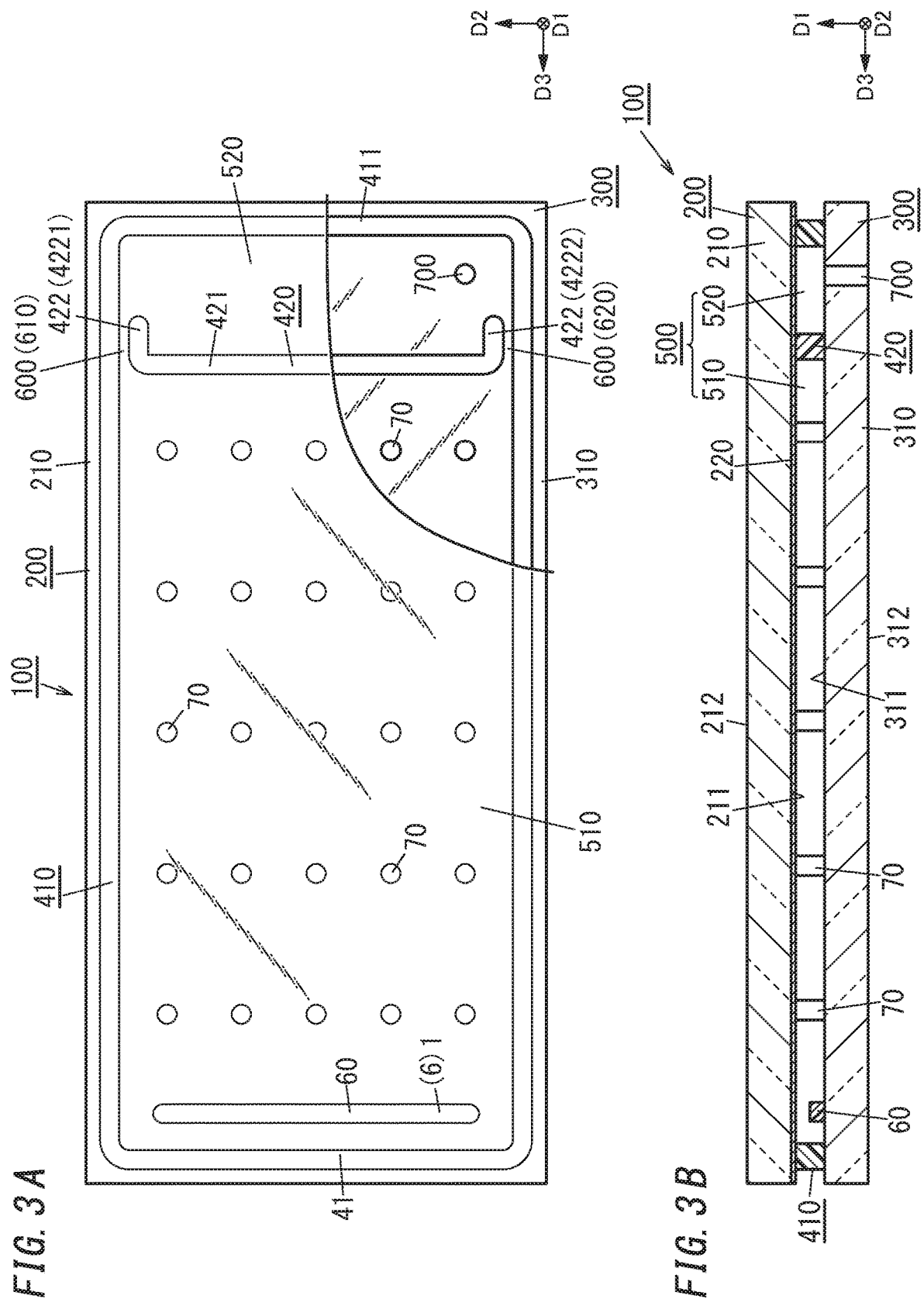

GETTER MATERIAL, METHOD FOR MANUFACTURING GETTER MATERIAL, METHOD FOR MANUFACTURING GETTER-MATERIAL-CONTAINING COMPOSITION, AND METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2019/010874, filed on Mar. 15, 2019, which in turn claims the benefit of Japanese Application No. 2018-069724, filed on Mar. 30, 2018, the entire disclosures of which Applications are incorporated by reference herein.

TECHNICAL FIELD

The present disclosure relates to getter materials, methods for manufacturing the getter materials, methods for manufacturing getter-material-containing compositions, and methods for manufacturing glass panel units. Specifically, the present disclosure relates to a getter material having a gettering ability realizable at a relatively low temperature, a method for manufacturing the getter material, a method for manufacturing a getter-material-containing composition, and a method for manufacturing a glass panel unit.

BACKGROUND ART

In a prescribed space, a getter material such as zeolite is caused to adsorb a gas component, thereby reducing the amount of the gas component in the space.

Regarding such a getter material, for example, Patent Literature 1 discloses that a getter composition containing zeolite and an inorganic binder is subjected to a heat process, and the heat process melts the inorganic binder to bond the inorganic binder to a surface of the zeolite and removes a volatile component in the zeolite, thereby improving the gettering ability of the zeolite.

In the getter material as described in Patent Literature 1, however, the surface of the zeolite is bonded to the inorganic binder melted, that is, part of the surface of the zeolite is covered with the inorganic binder. Therefore, in order to realize a satisfactory gettering ability in the space, the usage amount of the getter material in the space has to be increased. This increases the cost of the getter material. Moreover, the volatile component in the zeolite is removed by inciting the inorganic binder, but the melting temperature of the inorganic binder tends to damage elements in the periphery of the getter material.

CITATION LIST

Patent Literature

Patent Literature 1: JP 2007-511102 A

SUMMARY OF INVENTION

It is an object of the present disclosure to provide a getter material, a method for manufacturing the getter material, a method for manufacturing a getter-material-containing composition, and a method for manufacturing a glass panel unit while the usage amount of a getter material is reduced and a gettering ability is realizable at a relatively low temperature reducing damages on elements in the vicinity of the getter material.

One aspect of the present disclosure is a method for manufacturing a glass panel unit, the method including a step of producing a getter material by heating an unprocessed getter material at a temperature higher than a prescribed temperature; a step of producing a preassembled component including a first glass pane, a second glass pane facing the first glass pane a heat-fusible sealing material disposed between the first glass pane and the second glass pane, being in contact with the first glass pane and the second glass pane, and having a frame shape, an internal space surrounded by the first glass pane, the second glass pane, and the heat-fusible sealing material having the frame shape, a gas adsorbent containing the getter material and disposed in the internal space, and an evacuation port connecting the internal space to an outside space; a step of forming a frame body by melting the heat-fusible sealing material with heat such that the frame body hermetically bonds the first glass pane and the second glass pane together; and a step of heating the gas adsorbent at the prescribed temperature while the internal space is evacuated by exhausting air in the internal space through the evacuation port.

One aspect according to the present disclosure is a method for manufacturing a getter material, the method including generating a body of an unprocessed getter material as a solid residue by vaporization and desorption of a retention component held by the unprocessed getter material by heating the retention component; and producing, after the desorption of the retention component, a getter material by causing the body to adsorb an adsorption component having bond energy for bonding to the body, the bond energy being lower than a prescribed temperature when converted into temperature. The getter material is configured to, after vaporization and desorption of the adsorption component at a temperature higher than or equal to the bond energy converted into the temperature, at least adsorb a gas component different from the adsorption component.

One aspect according to the present disclosure is a method for manufacturing a getter-material-containing composition, the method including mixing the getter material produced by the method for manufacturing the getter material with a solvent.

One aspect of the present disclosure is a getter material including an adsorption component, and a body on which the adsorption component is adsorbed. The adsorption component is adsorbed on the body with bond energy, the bond energy being lower than or equal to a prescribed temperature when converted into temperature. The getter material is configured to, after vaporization and desorption of the adsorption component at a temperature higher than or equal to the bond energy converted into the temperature, at least adsorb a gas component different from the adsorption component.

The present disclosure enables the usage amount of the getter material to be reduced and enables the gettering ability to be realized at a relatively low temperature reducing damage on elements in the vicinity of the getter material.

BRIEF DESCRIPTION OF DRAWINGS

FIG. 3A is a schematic plan view schematically illustrating one example of a preassembled component according to the embodiment;

FIG. 3B is a schematic sectional view schematically illustrating a cross section of the preassembled component;

DESCRIPTION OF EMBODIMENTS

An embodiment of the present disclosure will be described

<Method for Manufacturing Glass Panel Unit>

A method for manufacturing glass panel unit (hereinafter referred to simply as a "manufacturing method (M1)" in some cases) according to one embodiment will be described with reference to FIGS. 1A to 8.

The manufacturing method (M1) includes a getter material body generation step, a getter material producing step, an assembling step, a frame body forming step, and an exhaust step.

Figure 1A:
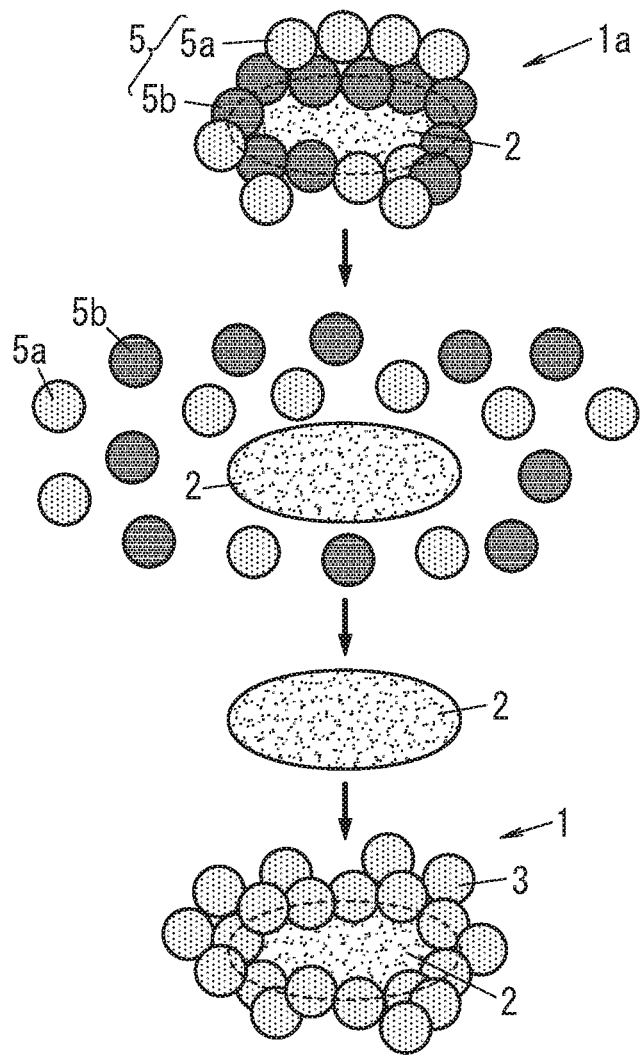
FIG. 1A is a view illustrating a method for manufacturing a glass panel unit according to an embodiment.

As shown in FIG. 1A, the getter material body generation step is a step of generating a getter material body 2 as a solid residual by subjecting a retention component 5 held by an unprocessed getter material (an initial stage getter material) 1a to vaporization and desorption while the retention component 5 is heated. Thus, the initial stage getter material 1a is an intermediate product used in an initial stage for obtaining the getter material body 2.

The retention component 5 includes a first retention component 5a and a second retention component 5b. The first retention component 5a is a component easily vaporized from the initial stage getter material 1a when the retention component 5 is desorbed. The second retention component 5b is a component which is less easily vaporized from the initial stage getter material 1a than the first retention component 5a during desorption of the retention component.

An aspect in which the second retention component 5b is held by the initial stage getter material 1a may result from a sintering process performed in the presence of the second retention component 5b to produce the initial stage getter material 1a. Even when the initial stage getter material 1a holds not only the second retention component 5b but also the first retention component 5a, the first retention component 5a is substituted with the second retention component 5b over time if the initial stage getter material 1a is stored in the presence of the second retention component 5b for a long time period because the second retention component 5b has a greater affinity with the getter material body 2 than the first retention component 5a.

Thus, since the initial stage getter material 1a adsorbs and holds the second retention component 5b, simply desorbing the first retention component 5a which is easily vaporized from the initial stage getter material 1a does not result in a desirable gettering ability of the initial stage getter material 1a in the present embodiment.

The first retention component 5a may be adsorbed by physical adsorption on and held by the initial stage getter material 1a. In this case, the first retention component 5a is held by the initial stage getter material 1a due to interaction between one monopole of a dipole in the first retention component 5a and an electric charge of the initial stage getter material 1a. Moreover, the second retention component 5b may be adsorbed by chemical adsorption, such as covalent bonding or ionic bonding, on and held by the initial stage getter material 1a.

To desorb the retention component 5, the initial stage getter material 1a is heated under a condition that the second retention component 5b is vaporized and desorbed. That is, under a desorption condition of the second retention component 5b, the first retention component 5a and the second retention component 5b are desorbed. A temperature at which the initial stage getter material 1a is heated is higher than an exhaust temperature Te in the exhaust step which will be described later. The initial stage getter material 1a is heated, for example, at a temperature higher than 350° C., and lower than or equal to 700° C. Then, after the desorption of the retention component 5, the retention component 5 is exhausted, thereby generating the getter material body 2. The first retention component 5a is vaporized and desorbed from the initial stage getter material 1a by, for example, heating the initial stage getter material 1a at a temperature lower than or equal to 300° C., In this case, the first retention component 5a is vaporized and desorbed from the initial stage getter material 1a also by heating the initial stage getter material 1a at a temperature higher than 300° C. The desorption of the second retention component 5b does not occur by, for example, simply heating the initial stage getter material 1a at a temperature lower than or equal to 300° C., but the second retention component 5b is vaporized and desorbed from the initial stage getter material 1a by heating the initial stage getter material 1a at a temperature higher than 350° C.

Examples of the first retention component 5a include water, nitrogen, and a carbon dioxide. Examples of the second retention component 5b include oxygen.

Figure 1B:
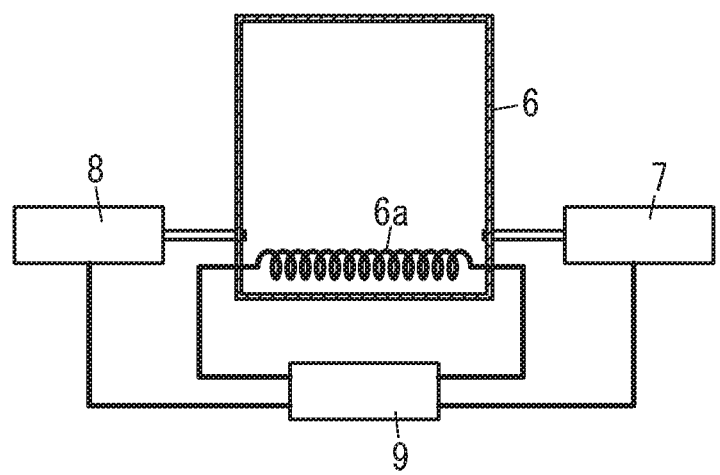
FIG. 1B is a conceptual view specifically illustrating one example of a device used for manufacturing the getter material in the embodiment.

In the present embodiment, the getter material body generation step is preferably performed in a chamber 6 as shown in FIG. 1B. Thus, the retention component 5 is easily desorbed, and the retention component 5 after the desorption is exhausted outside the chamber 6, thereby easily generating the getter material body 2.

The chamber 6 includes a heater 6a disposed on one side in the chamber 6. Respective ends of the chamber 6 are connected to an exhaust pump 7 and a feeder 8. The heater 6a, the exhaust pump 7, and the feeder 8 are connected to a controller 9.

The controller 9 is connected to the heater 6a, and therefore, the heater 6a heats the interior of the chamber 6 and/or stops heat generation while operation of the heater 6a is controlled by the controller 9. The controller 9 is connected to the exhaust pump 7, and therefore, the exhaust pump 7 evacuates the chamber 6 while operation of the exhaust pump 7 is controlled by the controller 9. The controller 9 is connected to the feeder 8, and therefore, the feeder 8 feeds an adsorption component 3 to the chamber 6 while operation of the feeder 8 is controlled by the controller 9.

The getter material body generation step is performed in the chamber 6, and therefore, the retention component 5 after the desorption is exhausted outside the chamber 6 by the exhaust pump 7. In this way, the getter material body 2 is generated as a solid residual in the chamber 6. In the getter material body generation step, the initial stage getter material 1a may be heated to exhaust the retention component 5 outside the chamber 6 while the retention component 5 is desorbed. In this case, the interior of the chamber 6 is not limited to an evacuated space but may be an atmosphere of an inert gas. The inert gas is, for example, at least one kind of component selected from the group consisting of neon, xenon, and argon. The interior of the chamber 6 when the desorption of the retention component 5 is performed is an evacuated space, more preferably a vacuum space.

In the getter material body generation step, the pressure in the chamber 6 may be, for example, higher than or equal to 10-5 Pa and lower than or equal to 0.1 Pa. Moreover, when the retention component 5 is exhausted outside the chamber 6, operation of the feeder 8 may be stopped.

In the getter material body generation step, the interior of the chamber 6 is heated at a temperature at which the second retention component 5b is desorbed, and therefore, the adsorption component 3 is less likely to be adsorbed on the getter material body 2 at the temperature in the getter material body generation step. Thus, the getter material producing step is performed after the getter material body generation step. However, in the getter material body generation step, the feeder 8 may be operated to feed the adsorption component 3 to the interior of the chamber 6. In this case, while the exhaust pump 7 exhausts the retention component 5 outside the chamber 6, the feeder 8 supplies the adsorption component 3 to the interior of the chamber 6, which reduces a time required for production of the getter material 1.

The getter material producing step is a step of producing the getter material 1 by causing the adsorption component 3 to be adsorbed on the getter material body 2. The adsorption component 3 is a component easily vaporized at the exhaust temperature Te in the exhaust step which will be described later. When the getter material body generation step is performed in the chamber 6, the getter material producing step is also performed in the chamber 6. Thus, the adsorption component 3 is supplied by the feeder 8 to the interior of the chamber 6. Thus, the adsorption component 3 is adsorbed on the getter material body 2.

Figure 2A:
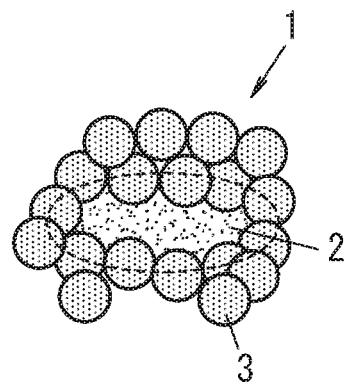
FIG. 2A is a conceptual view schematically illustrating one example of the getter material according to the embodiment.

As illustrated in FIG. 2A, the getter material 1 includes the adsorption component 3 and a body (the getter material body) 2.

As described above, the getter material body 2 is a solid residual obtained by vaporization and desorption of the retention component 5 held by the initial stage getter material 1a (see FIG. 1A).

Figure 2B:
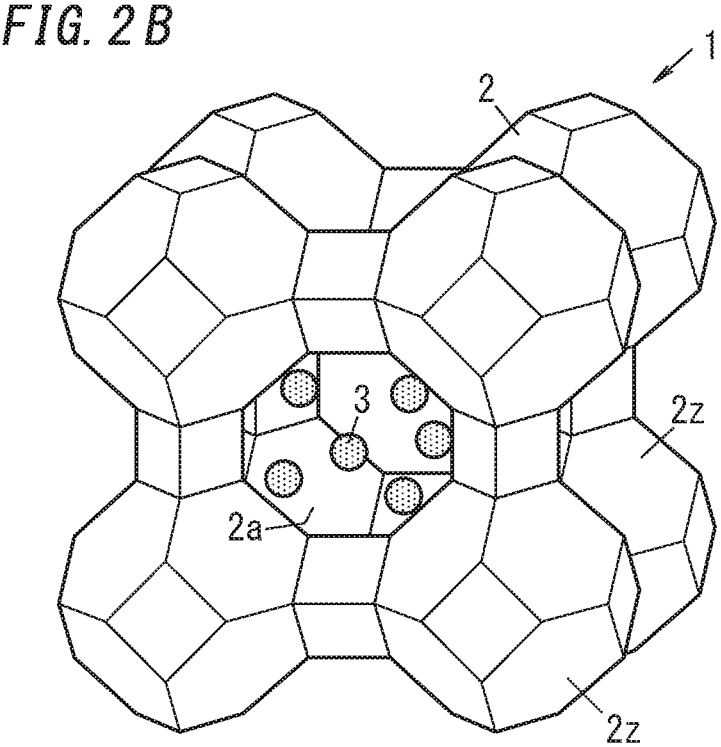
FIG. 2B is a conceptual view specifically illustrating the getter material on which an adsorption component is adsorbed.
Figure 2C:
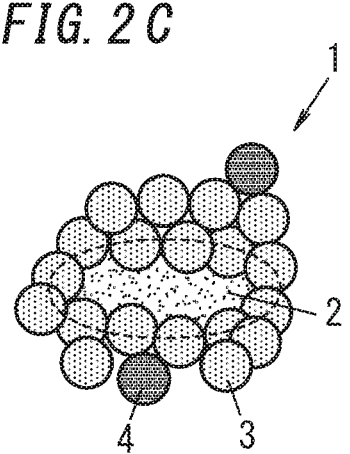
FIG. 2C is a conceptual view schematically illustrating another example of the getter material.
Figure 2D:
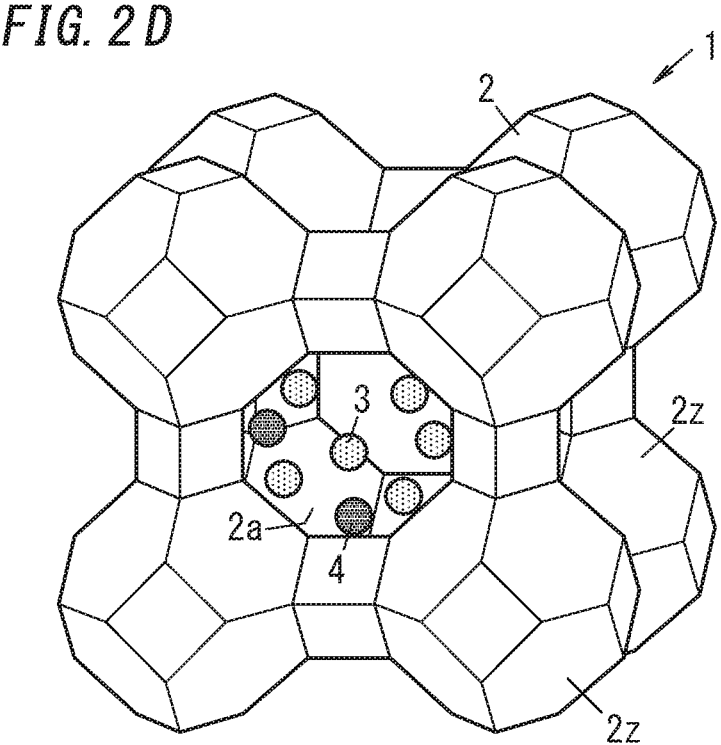
FIG. 2D is a conceptual view specifically illustrating the getter material on which an adsorption component is adsorbed.

The getter material body 2 adsorbs the adsorption component 3 as shown in FIGS. 2A and 2B. Here, each of FIGS. 2A and 2B shows in an exaggerated manner that the getter material body 2 adsorbs the adsorption component 3. Specifically, the getter material body 2 adsorbs the adsorption component 3 at a molecule level. In this case, as illustrated in FIGS. 2A and 2C, the getter material body 2 may adsorb, on its surface, the adsorption component 3. Alternatively, as illustrated in FIGS. 2B and 2D, the getter material body 2 may adsorb the adsorption component 3 in a fine pore 2a in the getter material body 2. The getter material body 2 may adsorb the adsorption component 3 on the surface and in the fine pore 2a.

When the getter material body 2 has the fine pore 2a, the getter material body 2 is porous. That is, the getter material body 2 includes a plurality of fine pores 2a. Such a getter material body 2 has a zeolite structure 2z. In examples shown in FIGS. 2B and 2D, one zeolite structure 2z is shown for the simplification of the description of a state where the adsorption component 3 is adsorbed, but the getter material body 2 includes a plurality of zeolite structures 2z. In this case, the zeolite structures 2z adjacent to each other are three-dimensionally coupled to each other. Thus, the getter material body 2 is a porous body having the plurality of fine pores 2a.

The zeolite structure 2z includes a composition represented by the following general formula (1).

$$Me_{2/x}O \cdot Al_2O_3 \cdot mSiO_2 \cdot nH_2O \qquad (1)$$

Here, Me is an x-valent cation present in the fine pore 2a, m is a silica/alumina ratio and is an integer greater than or equal to two, and n is an integer greater than or equal to 0. In the composition represented by the formula (1), a monovalent negative electric charge is generated in each Al ion. Thus, when Me is a cation having a valence of 2 or more, a positive electric charge is generated in the fine pore 2a. Moreover, when Me is a monovalent cation, the interior of the fine pore 2a is electrically neutral.

In the zeolite structure 2z, Me may be a monovalent cation. Me may be a cation having a valence of 2 or more. Me may be a combination of a monovalent cation and a cation having a valence of 2 or more. Examples of the monovalent cation include an alkali metal ion such as $Li^+$, $Na^+$, and $K^+$; a proton; and an ammonium ion ($NH^{4+}$). Examples of the cation having a valence of 2 or more include an alkaline earth metal ion such as $Ca^{2+}$, $Mg^{2+}$, and $Ba^{2+}$; and a transition metal ion such as $Cu^{2+}$, $Au^{2+}$, $Fe^{2+}$, $Zn^{2+}$, and $Ni^{2+}$.

Water ($H_2O$) in the general formula (I) is contained as crystal water in the zeolite structure 2z. Such water is contained in, for example, the fine pore 2a. Moreover, when the zeolite structure 2z is dehydrated with heat or the like, the moisture absorption of the zeolite structure 2z after the dehydration is increased. When the zeolite structure 2z is completely dehydrated, n in the general formula (1) is 0.

The getter material body 2 may be zeolite, or copper ion exchanged zeolite. In this case, the zeolite is a component, where Me in the general formula (I) is a monovalent cation. Moreover, the copper ion exchanged zeolite is a component, where Me in the general formula (1) is a copper ion, Here, the copper ion exchanged zeolite is a component including a copper ion held in the fine pore 2a. Thus, "copper ion exchanged zeolite" does not limit a specific kind of zeolite before a copper ion is held in the fine pore 2a. Note that the getter material body 2 is preferably a material on which nitrogen is adsorbable.

In the examples shown in FIGS. 2B and 2D, an A-type zeolite structure is shown, but the structure of the getter material body 2 is not limited to the A-type zeolite structure. The getter material body 2 may contain an arbitrary zeolite structure such as an X-type zeolite structure, a Y-type zeolite structure, and ZSM-5 structure.

The adsorption component 3 is adsorbed on the getter material body 2 with bond energy (BT1) which is lower than the prescribed temperature (Te) when converted into temperature. That is, the adsorption component 3 is a component having bond energy (BT1) for bonding to the getter material body 2, the bond energy (BT1) is lower than or equal to the prescribed temperature (Te) when converted into the temperature, and the component desorbs when the getter material 1 is heated at the prescribed temperature (Te). This enables a heating temperature for obtaining a prescribed gettering ability of the getter material 1 to be reduced. The prescribed temperature (Te) is an exhaust temperature Te which will be described later.

The adsorption component 3 is a component easily vaporized from the getter material body 2 by heating the getter material 1 at a temperature higher than or equal to the bond energy (BT1) converted into the temperature. As long as the adsorption component 3 is a component that is other than the second retention component 5$b$, that does not chemically react with the getter material body 2, and that is adsorbable on the getter material body 2, the adsorption component 3 may be an arbitrary component. Examples of the adsorption component 3 include nitrogen, hydrogen, carbon dioxide, water, neon, xenon, carbon hydride, and a carbon hydride derivative. Examples of the carbon hydride derivative include methanol, ethanol, and phenol. Of these components, one kind or two or more kinds of components may be used.

Moreover, the bond energy (BT1) between the adsorption component 3 and the getter material body 2 is not bond energy caused by chemical adsorption such as covalent bonding and ionic bonding. The adsorption component 3 may be adsorbed on the getter material body 2 by, for example, physical adsorption.

Moreover, as described above, the getter material body 2 is a porous part having a large number of fine pores 2$a$. Thus, the adsorption component 3 may be adsorbed on the getter material body 2 to fill the fine pore 2$a$ formed in the getter material body 2. Alternatively, the adsorption component 3 may be adsorbed on the getter material body 2 such that the adsorption component 3 agglomerates due to electric charge in the fine pore 2$a$. When the electric charge in the fine pore 2$a$ causes agglomeration of the adsorption component 3, the adsorption component 3 is adsorbed on the getter material body 2 due to interaction between one monopole of the dipole in the adsorption component 3 and the electric charge in the fine pore 2$a$.

As long as the adsorption component 3 is not chemically adsorbed on the getter material body 2, and the bond energy (BT1) between the adsorption component 3 and the getter material body 2 is not particularly limited. The bond energy (BT1) is, for example, lower than or equal to 300° C. when converted into the temperature. The bond energy (BT1) is, for example, lower than or equal to 200° C. The bond energy (BT1) is, for example, higher than or equal to 100° C.

The getter material 1 according to the present embodiment can at least adsorb a gas component (G) different from the adsorption component 3 by vaporization and desorption of the adsorption component 3 from the getter material body 2 at a temperature higher than or equal to the bond energy (BT1) converted into the temperature. Thus, the usage amount of the getter material 1 can be reduced and the adsorption component 3 can be desorbed at a relatively low temperature at which damage is less likely to be caused on elements in the vicinity of the getter material 1, and therefore, high gettering ability of the getter material 1 is realizable.

The gas component (G) is, for example, a gas in a vacuum space 50 which will be described later. The gas component (G) is at least a gas adsorbable on the getter material body 2 after the desorption of the adsorption component 3, and a specific compound name of the gas component (G) is not particularly limited. Examples of the gas component (G) include nitrogen, oxygen, carbon dioxide, water vapor, methane, ethane, neon, and xenon.

Moreover, the getter material 1 may further contain a second adsorption component 4 as illustrated in FIGS. 2C and 2D. When the getter material 1 includes the second adsorption component 4 as in this case, the adsorption component 3 is a first adsorption component. When air containing nitrogen as a main component is supplied for supplying of the first adsorption component 3, the second adsorption component 4 corresponds to oxygen in the air.

The second adsorption component 4 is adsorbed on the getter material body 2 having bond energy (BT2) which is higher than the prescribed temperature Te when converted into the temperature. That is, the second adsorption component 4 is a component having the bond energy (BT2) for bonding to the getter material body 2, the bond energy (BT2) is higher than the prescribed temperature Te when converted into the temperature, and the component is not adsorbed by heating the getter material body 2 at the prescribed temperature Te but is adsorbed by heating the getter material body 2 at a temperature higher than the prescribed temperature Te. The second adsorption component 4 is a component whose vaporization and desorption from the getter material body 2 is less likely to be caused by heating the getter material 1 as compared to the first adsorption component 3. Moreover, the second adsorption component 4 is a minor component of the getter material 1.

The second adsorption component 4 may be adsorbed on a surface of the getter material body 2 as illustrated in FIG. 2C. Alternatively, the second adsorption component 4 may be adsorbed in a fine pore 2$a$ formed in the getter material body 2 as illustrated in FIG. 2D. The second adsorption component 4 may be adsorbed on the surface and in the fine pore 2$a$ of the getter material body 2.

When the getter material 1 includes the first adsorption component 3 and the second adsorption component 4, the content of the first adsorption component 3 is greater than that of the second adsorption component 4 in the getter material 1. In this case, since the amount of the first adsorption component 3 of components adsorbed on the getter material body 2 is dominant, the second adsorption component 4 is adsorbed as a minor component on the getter material body 2. As described above, when the getter material 1 includes the second adsorption component 4, storing the getter material 1 in a container filled with components similar to the first adsorption component 3 suppresses the first adsorption component 3 of the getter material body 2 from being substituted with the second adsorption component 4.

The second adsorption component 4 may be adsorbed on the getter material body 2 by chemical adsorption such as covalent bonding and ionic bonding. The bond energy (BT2) between the second adsorption component 4 and the getter material body 2 is not particularly limited. The bond energy (BT2) is, for example, higher than 300° C. when converted into temperature. The bond energy (BT2) is, for example, higher than or equal to 400° C. The bond energy (BT2) is, for example, higher than or equal to 450° C. The bond energy (BT2) is, for example, lower than or equal to 700° C.

When the second adsorption component 4 is adsorbed on the getter material body 2, a mixture obtained by mixing the second adsorption component 4 with the first adsorption component 3 may be fed to the interior of the chamber 6 by the feeder 8. In this case, the ratio of the first adsorption component 3 is preferably greater than that of the second adsorption component 4. Moreover, the second retention component 5b which is not desorbed in the getter material body generation step and which remains as the minor component on the getter material body 2 may be the second adsorption component 4. Examples of the second adsorption component 4 include oxygen.

Even when the getter material 1 of the present embodiment contains the second adsorption component 4 as the minor component, the usage amount of the getter material 1 can be reduced and the first adsorption component 3 can be desorbed at a relatively low temperature at which damage is less likely to be caused on elements in the vicinity of the getter material 1, and therefore, high gettering ability of the getter material 1 is realizable.

The bond energy according to the present embodiment may adopt a desorption peak temperature in a temperature rise desorption analysis at, for example, a rate of temperature rise of 5° C./min.

The manufacturing method (M1) further includes a getter material body cooling step. The getter material body cooling step is performed between the getter material body generation step and the getter material producing step. The getter material body cooling step is a step of cooling the getter material body 2 after the desorption of the retention component 5.

In the getter material body cooling step, heat generation by the heater 6a is stopped. After the heater 6a is turned off, the adsorption component 3 is fed from the feeder 8 and the adsorption component 3 in the chamber 6 is exhausted outside the chamber 6 by the exhaust pump 7. Thus, the interior of the chamber 6 can be cooled. In the getter material body cooling step, the adsorption component 3 is fed, and therefore, in the course of the getter material body cooling step, the getter material producing step may be performed.

In the present embodiment, when the adsorption component 3 is constituted by a component which is liquid under a room temperature and an atmospheric pressure, the chamber 6 does not have to be connected to the feeder 8. In this case, after the getter material body generation step, the interior of the chamber 6 is cooled, and the getter material body 2 after the cooling may be soaked in the liquid. Thus, the adsorption component 3 can be adsorbed on the getter material body 2. After the adsorption of the adsorption component 3, the getter material 1 may be dried such that the adsorption component 3 is not fully desorbed from the getter material body 2.

In the manufacturing method (M1), after the production of the getter material 1, the getter material 1 is subjected to an assembling step, the frame body forming step, and the exhaust step.

The getter material 1 can at least adsorb a gas component (G) different from the adsorption component 3 by vaporization and desorption of the adsorption component 3 from the getter material body 2 at a temperature higher than or equal to the bond energy (BT1) converted into the temperature. Thus, the usage amount of the getter material 1 can be reduced and the adsorption component 3 can be desorbed at a relatively low temperature at which damage is less likely to be caused on elements in the vicinity of the getter material 1, and therefore, high gettering ability of the getter material 1 is realizable. Thus, a heating temperature for obtaining a prescribed gettering ability of the getter material 1 can be reduced, and a first melting temperature Tm1 and a second melting temperature Tm2 which will be described later can be reduced. In other words, the getter material 1 can be preferably used under a condition that the first melting temperature Tm1 and the second melting temperature Tm2 which will be described later are low.

Figure 4:
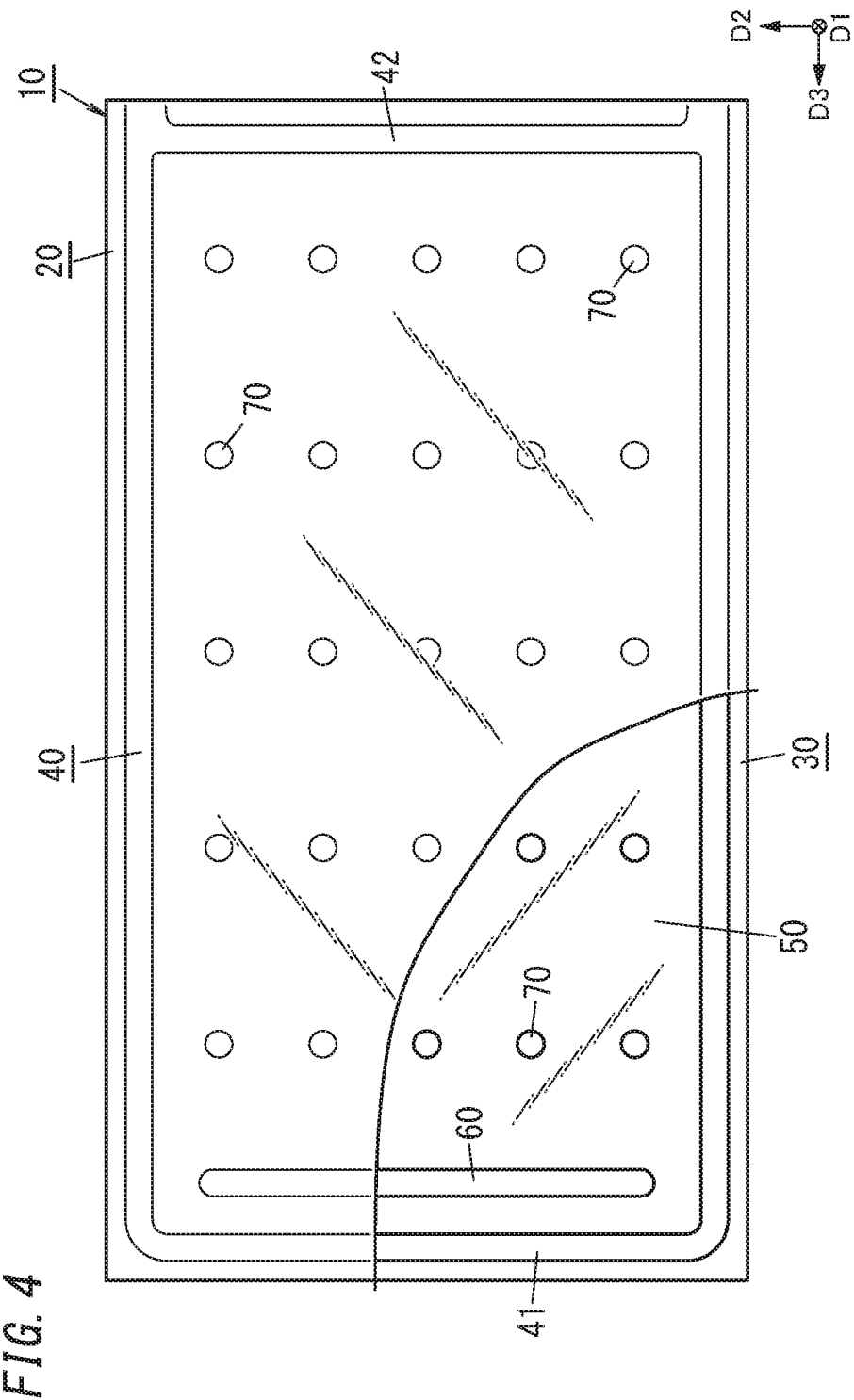
FIG. 4 is a schematic plan view schematically illustrating one example of the glass panel unit according to the embodiment.

The assembling step is a step of producing a preassembled component 100 as illustrated in FIGS. 3A and 3B. The preassembled component 100 is an intermediate body of a glass panel unit 10 as illustrated in FIG. 4 and is produced before the frame body forming step.

Moreover, to simplify the description of the present embodiment, the thickness direction of the preassembled component 100 and the glass panel unit 10 is referred to as a D1 direction. A direction orthogonal to the D1 direction is referred to as a D2 direction, and a direction orthogonal to the D2 direction is referred to as a D3 direction. Moreover, the D1 direction may be the first direction, the D2 direction may be the second direction, and the D3 direction may be the third direction.

As illustrated in FIG. 3A, the preassembled component 100 includes the first glass pane 200, the second glass pane 300, the frame member 410, the internal space 500, the partition 420, the air passage 600, the evacuation port 700, the gas adsorbent 60, and the plurality of spacers 70.

The first glass pane 200 includes a glass pane 210 as a body of the first glass pane 200 and a coating 220. Note that the first glass pane 200 does not have to include the coating 220.

The glass pane 210 is a rectangular flat plate and includes a first surface 211, and a second surface 212. The first surface 211 is on an inner side of the preassembled component 100 and the glass panel unit 10, and the second surface 212 is an exposed surface of the preassembled component 100 and the glass panel unit 10. Each of the first surface 211 and the second surface 212 is a flat surface. The glass pane 210 is at least usable in the manufacturing method (M3) and may adopt an arbitrary glass pane. Examples of a material for the glass pane 210 include soda-lime glass, high strain-point glass, chemically strengthened glass, no-alkali glass, quartz glass, Neoceram, and physically strengthened glass.

The coating 220 is a film formed on the first surface 211. The coating 220 may be an infrared reflective film. In the present embodiment, the coating 220 is not limited to the infrared reflective film but may be a film having a desired physical property.

The second glass pane 300 includes a glass pane 310 as a body of the second glass pane 300. The glass pane 310 is a rectangular flat plate and includes a first surface 311, and a second surface 312. The first surface 311 is on the inner side of the preassembled component 100 and the glass panel unit 10, and the second surface 312 is an exposed surface of the preassembled component 100 and the glass panel unit 10. Each of the first surface 311 and the second surface 312 is a flat surface.

The planar shape of the glass pane 310 is the same as that of the glass pane 210. That is, the planar shape of the second glass pane 300 is the same as that of the first glass pane 200. Moreover, the thickness of the glass pane 310 is the same as the glass pane 210. The glass pane 310 is at least usable in the manufacturing method (M3) and may adopt an arbitrary glass pane. Examples of a material for the glass pane 310 include soda-lime glass, high strain-point glass, chemically strengthened glass, no-alkali glass, quartz glass, Neoceram, and physically strengthened glass. The glass pane 310 is the same as, for example, the glass pane 210.

The second glass pane 300 may consist of the glass pane 310. The second glass pane 300 is disposed to face the first glass pane 200. In this case, the first surface 311 faces the first surface 211. Moreover, the second glass pane 300 is parallel to, for example, the first glass pane 200.

The frame body 410 is located between the first glass pane 200 and the second glass pane 300 and is in contact with the first glass pane 200 and the second glass pane 300. Thus, the preassembled component 100 includes the internal space 500 surrounded by the frame body 410, the first glass pane 200, and the second glass pane 300.

The frame body 410 is a heat-fusible sealing material which has a frame shape and which is obtained from a thermal adhesive (A1) disposed on both peripheral portions, namely, an outer peripheral edge of the first glass pane 200 and the outer peripheral edge of the second glass pane 300. The thermal adhesive (A1) is a first thermal adhesive having a first softening point. The first thermal adhesive contains glass frit. The first thermal adhesive consists of, for example, glass frit. The glass frit is, for example, low-melting-point glass frit. Examples of the low-melting-point glass frit include bismuth-based glass frit, lead-based glass frit, and vanadium-based glass frit. Of these examples, one kind or two or more kinds of glass frit may be contained in the first thermal adhesive.

The partition 420 is disposed in the internal space 500. The partition 420 divides the internal space 500 into a first space 510 which is to become a vacuum space 50 through the exhaust step and a second space 520 communicated with the evacuation port 700.

The partition 420 includes a wall section 421 and a blocking section 422. The blocking section 422 includes a first blocking section 4221 and a second blocking section 4222. The wall section 421 is formed along the D2 direction. In this case, the evacuation port 700 is provided in a flat surface area surrounded by the wall section 421 and the frame body 410. Moreover, the D2 direction is, for example, the width direction of the second glass pane 300. Moreover, in the D2 direction, both ends of the wall section 421 are not in contact with the frame body 410. The first blocking section 4221 is formed to extend from one end of both of the ends of the wall section 421 toward the second space 520. The second blocking section 4222 is formed to extend from the other end toward the second space 520. The one end of the wall section 421 may be a first end, and the other end may be the second end.

The partition 420 is made of the thermal adhesive (A2). The thermal adhesive (A2) is a second thermal adhesive having a second softening point. The second thermal adhesive includes glass frit. The second thermal adhesive consists of, for example, glass frit. The glass fit is, for example, low-melting-point glass frit. Examples of the low-melting-point glass frit include bismuth-based glass frit, lead-based glass frit, and vanadium-based glass frit. Of these examples, one kind or two or more kinds of glass frit may be contained in the second thermal adhesive. Moreover, the second thermal adhesive is the same as, for example, first thermal adhesive, in this case, the second softening point is the same as the first softening point.

The air passage 600 is communicated with the first space 510 and the second space 520 in the internal space 500. The air passage 600 includes a first air passage 610 and a second air passage 620. The first air passage 610 is a space formed between the first blocking section 4221 and part of the frame member 410 facing the first blocking section 4221. The second air passage 620 is a space formed between the second blocking section 4222 and part of the frame member 410 facing the second blocking section 4222.

The evacuation port 700 is a pore through which the second space 520 is communicated with the outside space. The evacuation port 700 is formed to exhaust air in the first space 510 through the second space 520 and the air passage 600. The evacuation port 700 is formed in the second glass pane 300 to connect the second space 520 and the outside space. The evacuation port 700 is located at, for example, a corner of the second glass pane 300.

The gas adsorbent 60 is disposed in the first space 510. Specifically, the gas adsorbent 60 has an elongated shape formed along the D2 direction. The gas adsorbent 60 is on an opposite side of the wall section 421 from the evacuation port 700 in the D3 direction. That is, the gas adsorbent 60 is disposed at an end of the first space 510 (vacuum space 50). In this way, the gas adsorbent 60 becomes less noticeable. Moreover, the gas adsorbent 60 is disposed at a location apart from the partition 420 and the air passage 600. Thus, when the air in the first space 510 is exhausted, it is possible to reduce the possibility that the exhausting of the air is hindered by the gas adsorbent 60.

The gas adsorbent 60 is used to absorb remaining gas present in the vacuum space 50 after the air is exhausted. The remaining gas includes gas released from the frame body 410, the partition 420, and the spacer 70 when the preassembled component 100 is heated. The remaining gas is adsorbed on the getter material 1 in the gas adsorbent 60.

The gas adsorbent 60 contains the getter material 1 or a getter-material-containing composition 1b. The getter material 1 has a property of releasing the adsorption component 3 at a temperature higher than or equal to the bond energy (BT1) converted into the temperature.

The gas adsorbent 60 contains the getter material 1 in powder form. The gas adsorbent 60 is formed by, for example, applying the getter-material-containing composition 1b onto the second glass pane 300. In this case, the gas adsorbent 60 may be reduced in size. Thus, even when the vacuum space 50 is small, the gas adsorbent 60 can be disposed. Moreover, when the getter-material-containing composition 1b contains a volatile solvent, the volatile solvent is removed after the application, thereby forming the gas adsorbent 60. Thus, the gas adsorbent 60 contains components other than the volatile solvent of the getter-material-containing composition 1b. That is, the gas adsorbent 60 may be a dried product of the getter-material-containing composition 1b.

The plurality of spacers 70 are adopted to maintain a prescribed space between the first glass pane 200 and the second glass pane 300. That is, the plurality of spacers 70 are used to maintain the distance between the first glass panel 20 and the second glass panel 30 to a desired value.

The plurality of spacers 70 are arranged in the first space 510. Specifically, the plurality of spacers 70 are arranged at respective intersections of a virtual rectangular grid. The distance between adjacent spacers 70 is, for example, 2 cm. The spacer 70 is at least configured to maintain the distance between the first glass pane 200 and the second glass pane 300, and the size of the spacer 70, the number of spacers 70, the distance between the spacers 70, and the arrangement locations of the spacers 70 may be accordingly selected.

The spacer 70 has a cylindrical shape having a height substantially equal to the height of the prescribed space. The spacer 70 has, for example, a diameter of 0.5 mm and a height of 100 μm. Moreover, each spacer 70 may have a desired shape such as a prism shape, a spherical shape, or the like.

The spacer 70 may be transparent or may be non-transparent. In particular, when the spacer 70 is satisfactorily small, the spacer 70 may be non-transparent. The material for the spacers 70 is selected so that the spacers 70 do not deform in a first melting step, an exhaust step, and a second melting step which will be described later. For example, materials for each spacer 70 are selected to have a softening point (softening temperature), for example, higher than the first softening point of the first thermal adhesive and the second softening point of the second thermal adhesive.

To form the spacers 70, for example, a plurality of spacers 70 are formed in advance, and with a chip mounter or the like, the plurality of spacers 70 may be arranged on prescribed locations on the second glass pane 300. Moreover, the plurality of spacers 70 may be formed by a photolithography technique and an etching technique. In this case, the plurality of spacers 70 are formed by curing, for example, a photocurable resin. Alternatively, the plurality of spacers 70 may be formed by a well-known thin film forming technique.

In the manufacturing method (M3), the frame body forming step is performed after the assembling step.

The frame body forming step is a step of forming a frame body 411 hermetically bonding the first glass pane 200 and the second glass pane 300 together by melting the frame body 410 by heating the frame body 410. The frame body 411 is a melted and hardened material of the frame body 410. Specifically, the frame body 411 is a portion formed by melting the glass frit in the frame body 410 by heating the glass frit and then curing the glass fit.

The frame body forming step is a first melting step. In the first melting step, the glass frit in the frame body 410 is once melted at the temperature (first melting temperature) Tm1 higher than or equal to the first softening point to hermetically bond the first glass pane 200 and the second glass pane 300 together. Specifically, the preassembled component 100 is disposed in a melting furnace and is heated at the first melting temperature Tm1 for a first melting time tm1 (see FIG. 6). The first melting temperature Tm1 is higher than the temperature of the bond energy (BT1) converted into the temperature. Thus, the adsorption component 3 is caused to be released from the gas adsorbent 60. Moreover, when the getter material 1 includes the second adsorption component 4 as a minor component of the getter material 1, the first melting temperature Tm1 is lower than the temperature of the bond energy (BT2) converted into the temperature, and therefore, the second adsorption component 4 is not desorbed from the gas adsorbent 60.

The first melting temperature Tm1 and the first melting time tm1 are determined such that the glass frit in the frame body 410 is melted but the partition 420 does not close the air passage 600. That is, the lower limit of the first melting temperature Tm1 is the first softening point, but the upper limit of the first melting temperature Tm1 is determined such that the air passage 600 is not closed with the partition 420. Moreover, when the second adsorption component 4 is caused to be desorbed from the getter material 1 in the first melting step, the temperature has to be increased, and the air passage 600 is likely to be closed. Therefore, in the present embodiment, even when the getter material 1 includes the second adsorption component 4 as the minor component of the getter material 1, the temperature is suppressed, and the second adsorption component 4 is not caused to be released from the gas adsorbent 60.

To melt the glass frit in the frame body 410 in the first melting step, for example, when the first softening point and the second softening point are 270° C., the first melting temperature Tm1 is set to 280° C. Moreover, the first melting time tm1 is, for example, 10 minutes.

In the first melting step, a melted product of the frame body 410 is cooled and cured, thereby forming the frame body 411. In the first melting step, the frame body 410 releases gas, but the gas is exhausted in the exhaust step.

The exhaust step is a step of heating the gas adsorbent 60 at a prescribed temperature (exhaust temperature) Te lower than the melting temperature of the glass frit in the frame body 410 while the internal space 500 is evacuated by exhausting air in the internal space 500 through the evacuation port 700. During the exhaust step, the gas adsorbent 60 is heated, and thereby, gas released from the frame body 410, the partition 420, and the spacer 70 in the first melting step and the exhaust step is less likely to be adsorbed on the gas adsorbent 60. Moreover, the gas released from the frame body 410, the partition 420, and the spacer 70 is exhausted while the internal space 500 is evacuated by exhausting the air through the evacuation port 700. During the exhaust step, the air in the first space 510 is exhausted at the exhaust temperature Te through the air passage 600, the second space 520, and the evacuation port 700, thereby the first space 510 is formed into the vacuum space 50. The exhaust temperature Te is a temperature higher than or equal to the temperature of the bond energy (BT1) converted into the temperature. Thus, the adsorption component 3 contained in the getter material 1 is desorbed from the getter material body 2 and is exhausted, and thereby, improving the gettering ability of the getter material 1. Moreover, also when the getter material 1 includes the second adsorption component 4 as a minor component of the getter material 1, the exhaust temperature Te is set to be lower than the temperature of the bond energy (BT2) converted into the temperature. The exhaust temperature Te is at least a temperature at which the frame body 410 and the partition 420 may be melted and extended, but the air passage 600 is not closed, and at the same time, desorption of the adsorption component 3 from the getter material 1 is possible. The exhaust temperature Te is, for example, 250° C.

Figure 5:
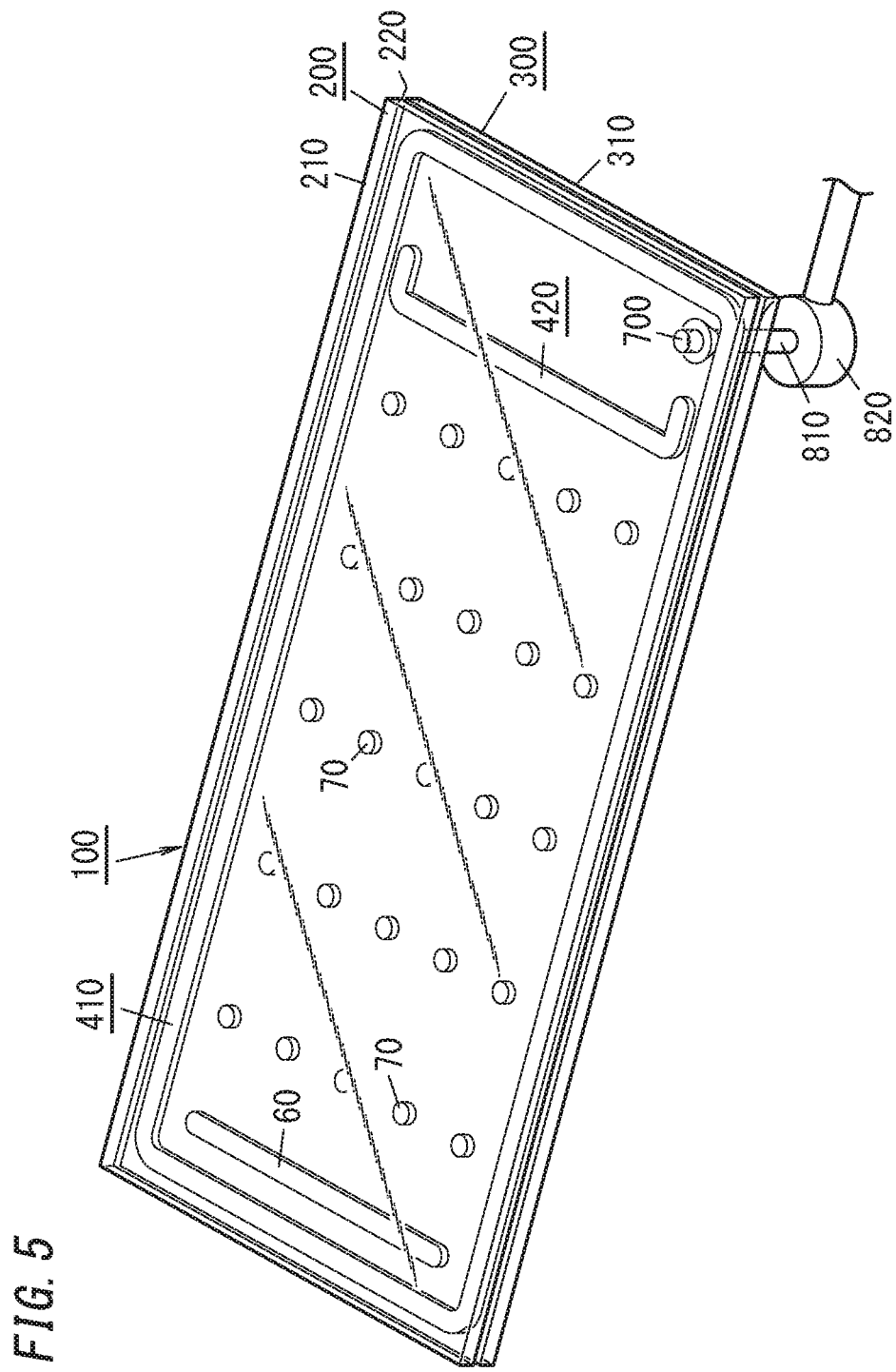
FIG. 5 is a view illustrating a method for manufacturing the glass panel unit according to the embodiment.
Figure 6:
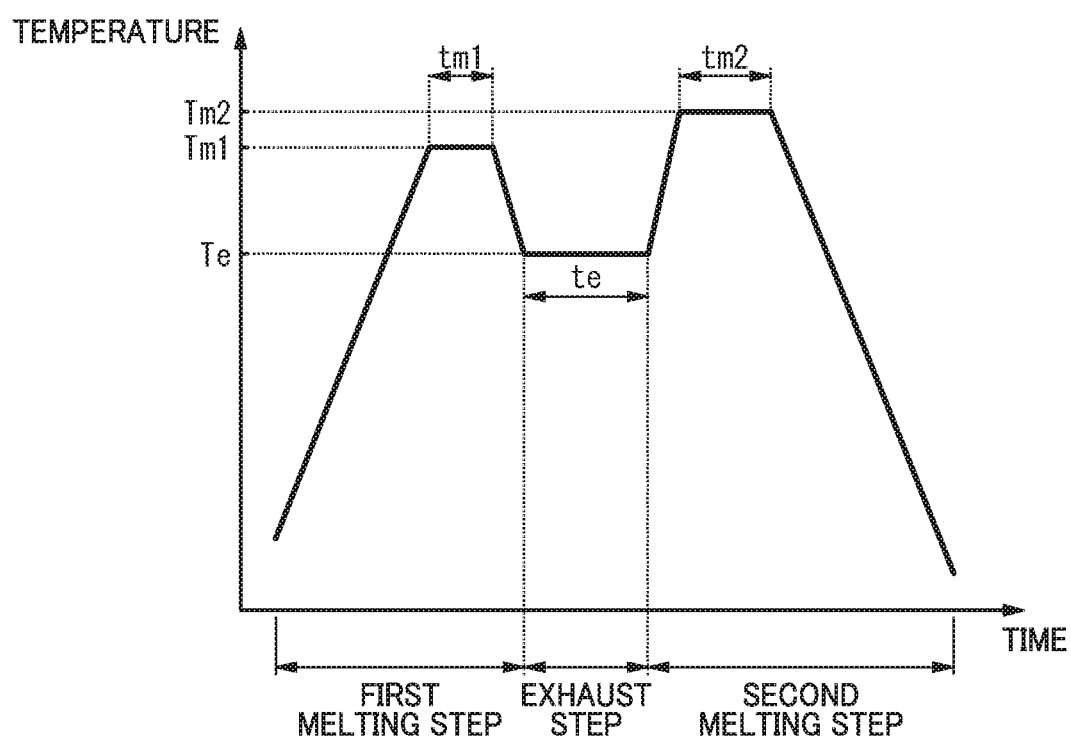
FIG. 6 is a view illustrating the method for manufacturing the glass panel unit according to the embodiment.

The exhaust step is performed with, for example, a vacuum pump. The vacuum pump is, as illustrated in FIG. 5, connected to the evacuation port 700 via an exhaust pipe 810 and a seal head 820. The exhaust pipe 810 is bonded to the second glass pane 300 to be communicated with the evacuation port 700. Then, the seal head 820 is attached to the exhaust pipe 810, thereby connecting an inlet of the vacuum pump to the evacuation port 700.

During the exhaust step, the frame body 411 and the partition 420 do not deformation. Moreover, in the first melting step, the preassembled component 100 is heated without exhausting air in the internal space 500, but also in the exhaust step, the gas adsorbent 60 may be heated, thereby exhausting the adsorption component 3. In this case, the adsorption component 3 from the gas adsorbent 60 is vaporized and is exhausted through the first space 510, the air passage 600, the second space 520, and the evacuation port 700.

The exhaust time te in the exhaust step is set such that the vacuum space 50 having a prescribed degree of vacuum is obtained. The exhaust time te is at least a time for which the internal space 500 becomes the vacuum space 50, and the exhaust time te is not particularly limited. The exhaust time te is, for example, set to 120 minutes.

After the exhaust step, when part of the adsorption component 3 remains in the vacuum space 50, the adsorption component 3 is adsorbed as the remaining gas on the getter material 1.

The manufacturing method (M3) further includes a second melting step.

The second melting step is a step of deforming the partition 420 to form a partition wall 42 closing the air passage 600, thereby forming a seal 40 surrounding the vacuum space 50. In the second melting step, the glass fit in the partition 420 is once melted at the second melting temperature Tm2 higher than or equal to the second softening point. Thus, the partition 420 is deformed to form the partition wall 42. Specifically, the first glass pane 200 and the second glass pane 300 are heated in a melting furnace at the second melting temperature Tm2 for the second melting time tm2 (see FIG. 6).

The second melting temperature Tm2 and the second melting time tm2 are set such that the glass frit in the partition 420 is melted and the partition wall 42 closing the air passage 600 is formed. Moreover, when the getter material 1 contains the second adsorption component 4 as a minor component of the getter material 1, the second melting temperature Tm2 may be higher than the temperature of the bond energy (BT2) converted into the temperature. When the second melting temperature Tm2 is higher than the temperature of the bond energy (BT2), the second adsorption component 4 is released in the vacuum space 50. However, since the second adsorption component 4 is the minor component of the getter material 1, the second adsorption component 4 is adsorbed again on the getter material 1 after the second melting step. Moreover, even when gas is released from the frame body 410 and/or the partition 420 after the air passage 600 is closed, the gas is adsorbed on the getter material 1. Thus, the degree of vacuum in the vacuum space 50 is suppressed from degrading. That is, the thermal insulation property of the glass panel unit 10 is less likely to be degraded.

The lower limit of the second melting temperature Tm2 is the second softening point (270° C.). An object of the second melting step, unlike the first melting step, is to deform the partition 420, and therefore, the second melting temperature Tm2 is set to a temperature higher than the first melting temperature (280° C.) Tm1. The second melting temperature Tm2 is set to, for example, 300° C. Moreover, the second melting time tm2 is, for example, 30 minutes. Note that the air passage 600 may be closed by adjusting pressure for crushing the frame body 410 and the partition 420 when the second melting temperature Tm2 is the same as the first melting temperature Tm1.

Figure 7:
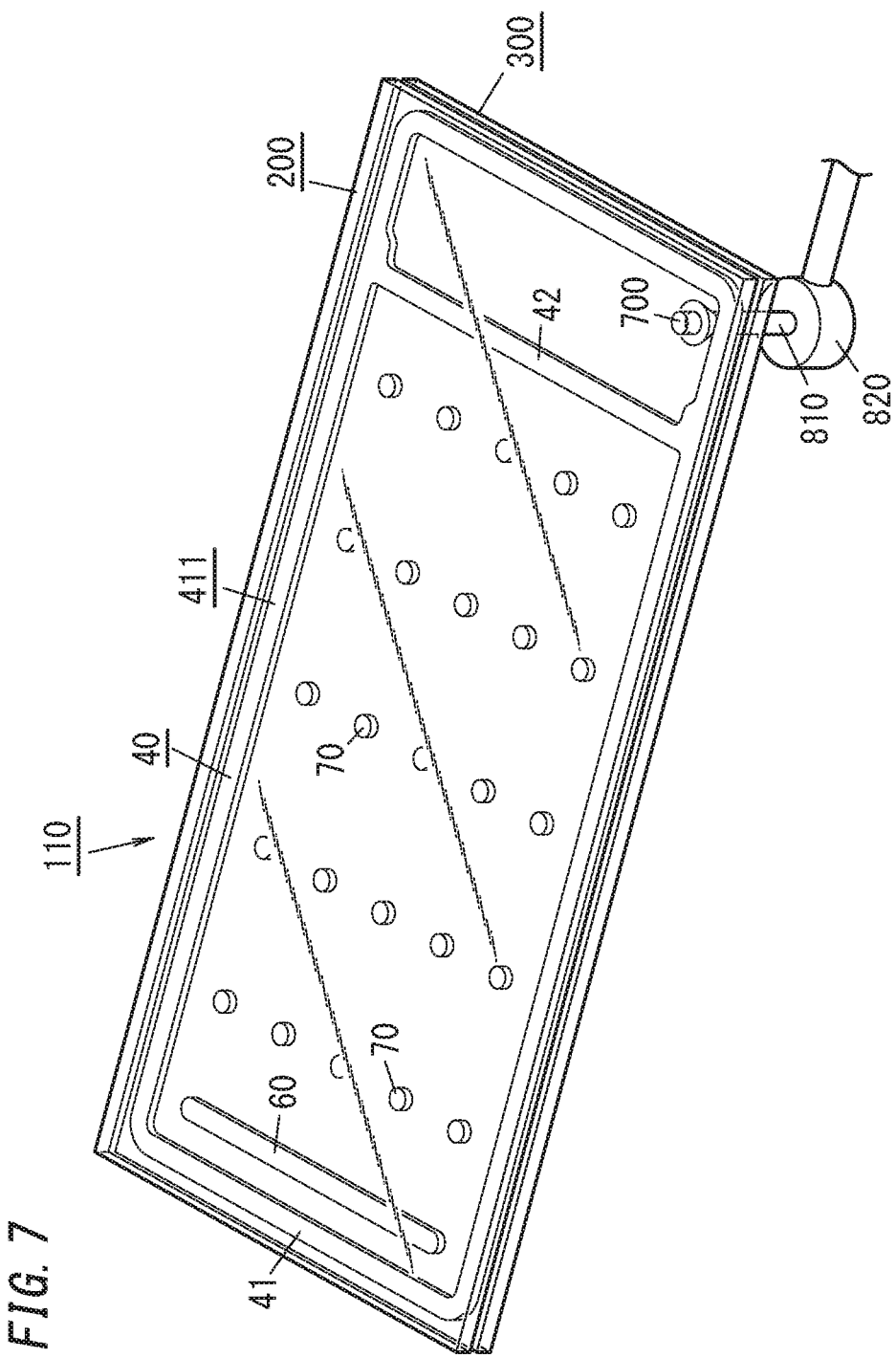
FIG. 7 is a view illustrating the method for manufacturing the glass panel unit according to the embodiment.

When the partition wall 42 as illustrated in FIG. 7 is formed, the vacuum space 50 surrounded by the partition wall 42 and the seal 40 including the frame body 411. Since the vacuum space 50 is formed at a portion corresponding to the first space 510, the partition wall 42 separates the vacuum space 50 and the second space 520. That is, the partition wall 42 forms a border separating the vacuum space 50 and a portion corresponding to the second space 520. Until the second melting step is completed, the frame member 411, the partition wall 42, the spacers 70 are heated, and therefore, gas may be released from the frame member 411, the partition wall 42, and the spacers 70. However, the gas released from the frame member 411, the partition wall 42, and the spacers 70 is adsorbed by the gas adsorbent 60 in the vacuum space 50. Thus, the degree of vacuum in the vacuum space 50 is suppressed from degrading. That is, the thermal insulation property of the glass panel unit 10 is less likely to be degraded.

Moreover, during the second inciting step, the exhaust step is continuously performed to exhaust air in the first space 510 through the air passage 600, the second space 520, and the evacuation port 700. That is, in the second melting step, while the air in the first space 510 is exhausted at the second melting temperature Tm2 through the air passage 600, the second space 520, and the evacuation port 700, the partition 420 is deformed to form the partition wall 42 closing the air passage 600. Thus, during the second melting step, the degree of vacuum in the vacuum space 50 can be further suppressed from being deteriorated. In addition, even when the air passage 600 is closed, the exhaust step continues, and therefore, directly before the air passage 600 is closed, the air in the first space 510 is exhausted, and after the partition wall 42 is formed, the adsorption component 3 is less likely to remain in the vacuum space 50.

The vacuum space 50 has a degree of vacuum lower than or equal to a prescribed value. It is required for the degree of vacuum in the vacuum space 50 only to suppress the thermal insulation property of the glass panel unit 10 from being degraded, and the degree of vacuum is not particularly limited. The degree of vacuum of the vacuum space 50 is, for example, 0.1 Pa.

The seal 40 surrounds the vacuum space 50 and hermetically bonds the first glass pane 200 and the second glass pane 300 together. The seal 40 has a frame shape. The seal 40 includes the first portion 41 and the second portion 42. The first portion 41 is a portion which is part of the frame body 411 and which is in contact with the vacuum space 50. That is, the first portion 41 is a portion which is part of the frame member 410 and Which faces the vacuum space 50. The first portion 41 constitutes three sides of four sides of the seal 40 and has a substantially U shape. The second portion 42 is a partition wall obtained by deforming the partition 420. The second portion 42 is I-shaped and is a remaining one side of the four sides of the seal 40.

During the second melting step, heating is performed at the second melting temperature Tm2, and then, cooling is performed to produce the glass panel unit 110. The cooling in the second melting step is at least satisfactorily cure the melted glass frit and may adopt any condition. The cooling in the second melting step may be, for example, natural cooling or cooling at a prescribed cooling speed.

The manufacturing method (M3) further includes a cutting step.

Figure 8:
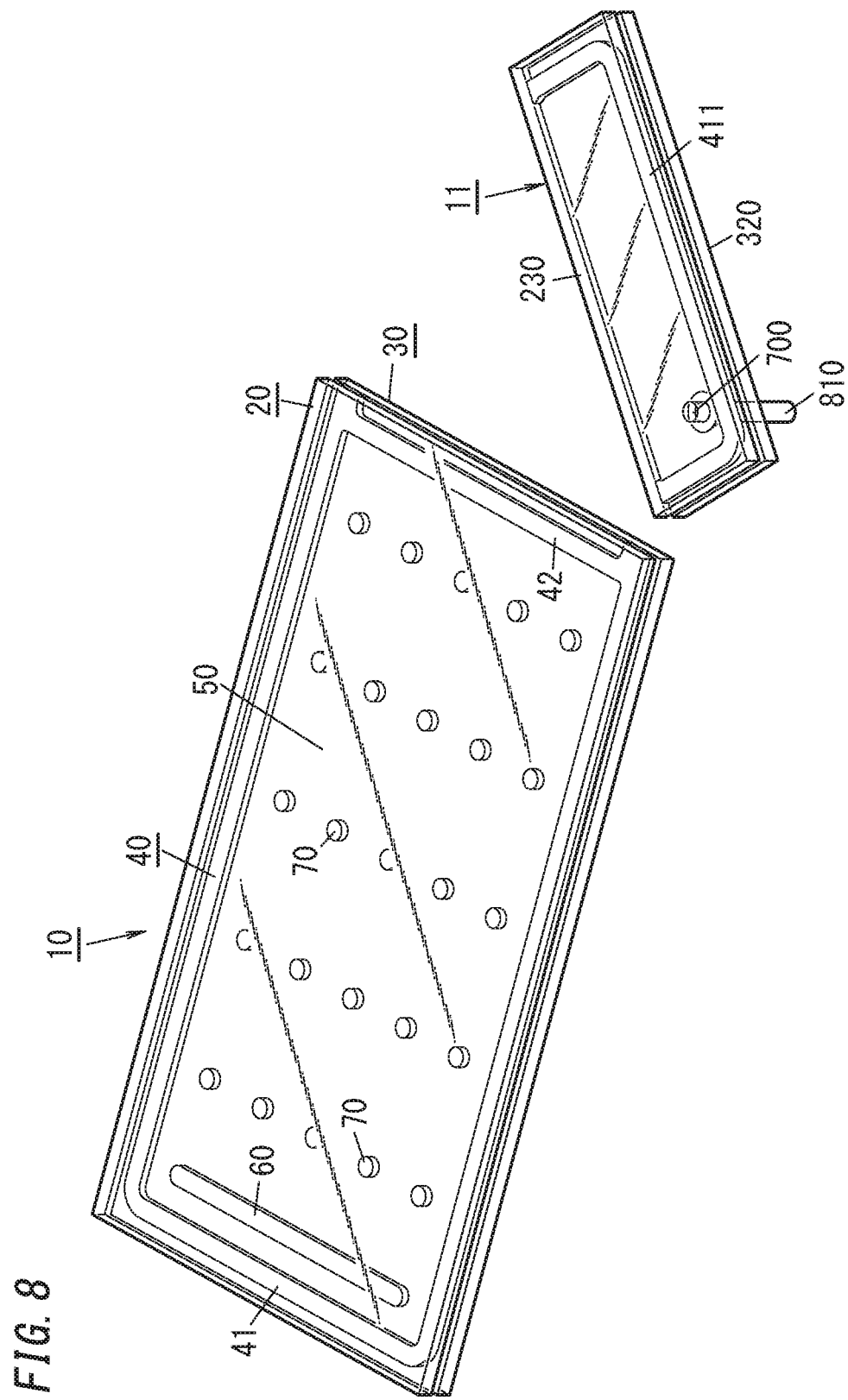
FIG. 8 is a view illustrating the method for manufacturing the glass panel unit according to the embodiment.
Figure 9B:
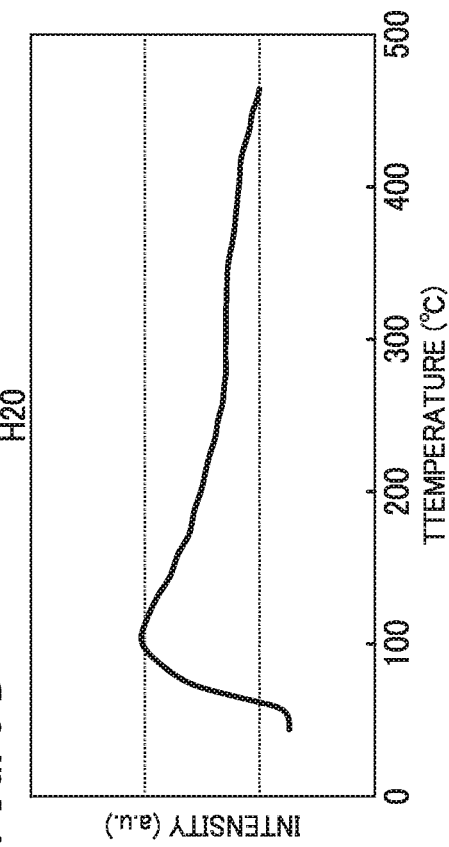
FIGS. 9A to 9D are comparative examples and are graphs each illustrating a transition curve of a desorption amount of an adsorbed component when an unprocessed getter material is warmed.
Figure 9D:
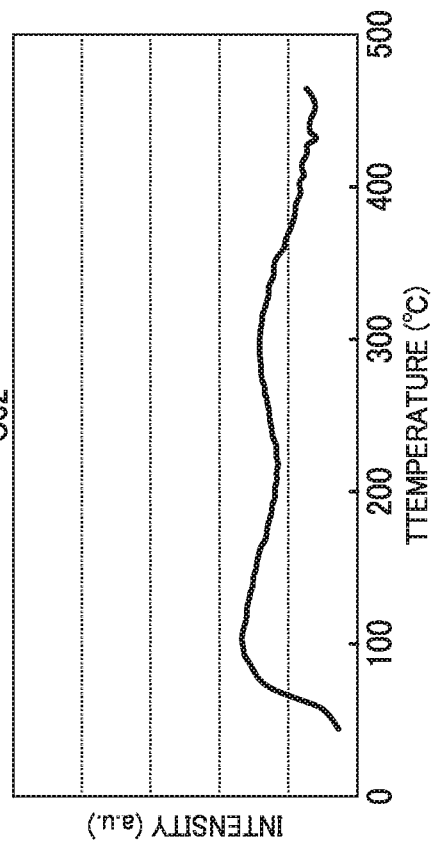
Figure 9A:
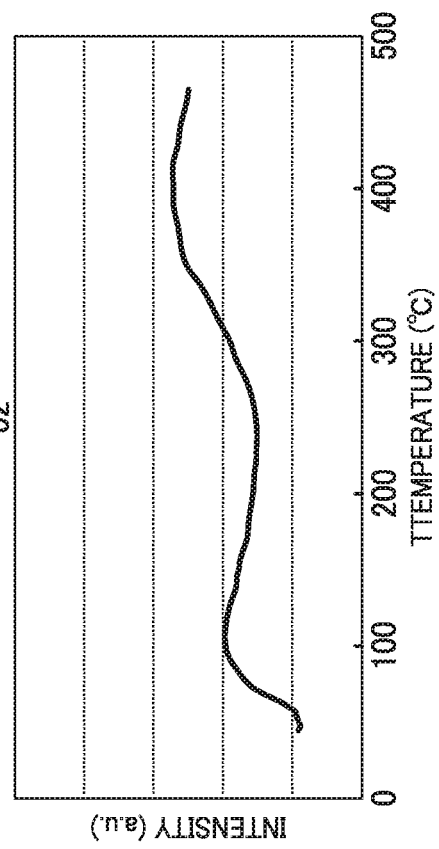
Figure 9C:
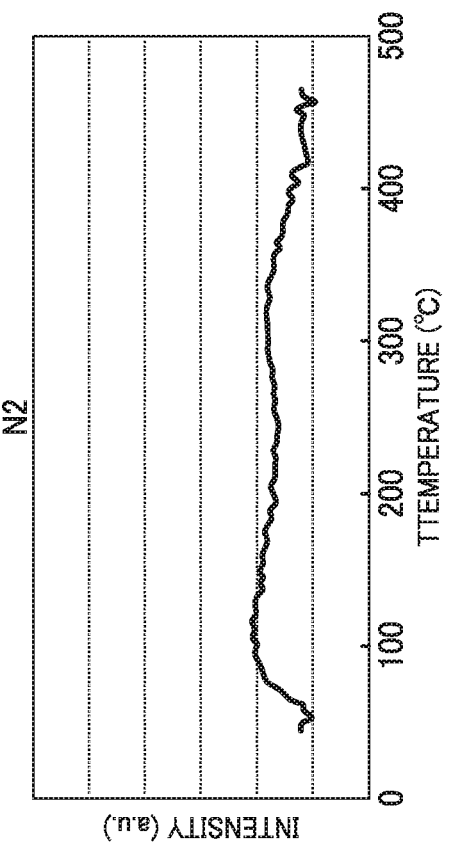

The cutting step is a step of, after the second melting step, cutting the glass panel unit 110 as shown in FIG. 8, The cutting step divides the portion having the vacuum space 50 from the portion (unnecessary portion) 11 having the second space 520. Of the portions thus divided, the portion having the vacuum space 50 serves as the glass panel unit 10.

According to the manufacturing method (M3), the gas adsorbent 60 contains the getter material 1, and therefore, the usage amount of the getter material 1 is reduced, and the gettering ability is realizable at a relatively low temperature which is less likely to damage elements (e.g., the first glass pane 200 and the second glass pane 300) in the vicinity of the getter material 1. Thus, the degree of vacuum in the vacuum space 50 is suppressed from being degraded, and the thermal insulation property of the glass panel unit 10 is less likely to be degraded.

Note that the embodiment describes an example in which the getter material 1 is used in the glass panel unit 110, but the getter material 1 may be used in electronic apparatuses such as a MEMS apparatus and/or a display.

<Method for Manufacturing Getter-Material-Containing Composition>

Next, a method for manufacturing getter-material-containing composition (hereinafter simply referred to as "manufacturing method (M2)" in some cases) will be described with reference to FIG. 10.

Figure 10:
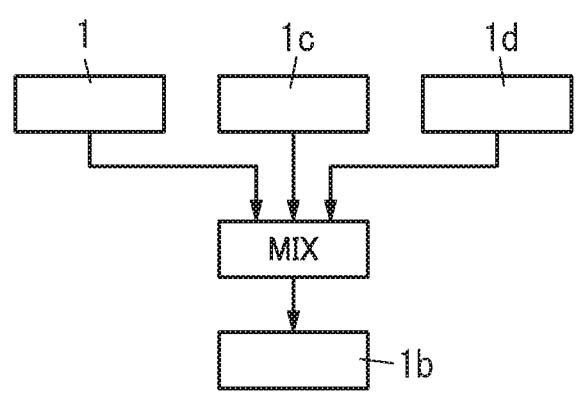
FIG. 10 is a flow chart schematically illustrating one example of a method for manufacturing a getter-material-containing composition according to one embodiment.

The manufacturing method (M2) is a method for manufacturing the getter-material-containing composition 1b containing the getter material 1 as illustrated in FIG. 10. Thus, the present embodiment may refer to the description of the getter material The manufacturing method (M2) includes a solvent mixing step. The solvent mixing step is a step of mixing the getter material 1 with a solvent 1c. In the solvent mixing step, the manufacturing method (M2) manufactures the getter-material-containing composition 1b containing the getter material 1 and the solvent 1c.

Moreover, mixing the getter material 1 with the solvent 1c makes the getter material body 2 less likely to adsorb the second retention component 5b, and therefore, the gettering ability of the getter material body 2 is maintained for a long time period. Thus, the stability of the getter material 1 is improved.

The solvent mixing step may adopt any mixing method as long as the getter material 1 is mixed with the solvent 1c. Examples of the mixing method in the solvent mixing step include three-roll milling, ball milling, sand milling, and paddle mixing.

The solvent 1c may be any solvent as long as it improves the stability of the getter material 1. Examples of the solvent 1c includes water, ethanol, and terpineol. Of these components, one kind or two or more kinds of components may be used.

Moreover, in the present embodiment, an additive 1d such as a thickening agent and a filler may be added in the solvent mixing step as long as it does not influence the stability of the getter material 1. When the additive 1d is added, the getter material 1, the solvent 1c, and the additive 1d may be simultaneously mixed with each other. Moreover, the additive 1d does not have to be added.

The getter-material-containing composition 1b is used for production of the gas adsorbent 60 in the manufacturing method (M1).

EXAMPLES

The present disclosure will be more specifically described with reference to examples below. However, the present disclosure is not limited to the contents of the examples.

Example 1

In a chamber 0.2 g of copper ion exchanged zeolite (unheated) were placed. After the zeolite was placed, the copper ion exchanged zeolite was heated at 450° C. for 1 hour while air in the chamber was exhausted to realize a vacuum space. Thus, a retention component held by the copper ion exchanged zeolite was desorbed. After the heating, the chamber was cooled to a room temperature. After the cooling, a nitrogen gas serving as an adsorption component with respect to the copper ion exchanged zeolite was caused to flow into the chamber, thereby adjusting the atmospheric pressure in the chamber to the atmospheric pressure. In this way, the getter material was produced.

Next, in the producing process of the glass panel unit, the getter material is once taken out of the chamber to simulate that the getter material is stored in atmosphere, and thereafter, the getter material was left in the atmosphere for 24 hours and was then returned into the chamber. Then, the chamber was evacuated, and then, the getter material was heated again at 300° C. for 1 hour to desorb nitrogen from the getter material.

Cooling is then performed, and thereafter, air corresponding to 5 Pa with respect to the volume of the chamber was caused to flow into the chamber, and after the pressure was stabilized, the pressure in the chamber was measured to obtain a measured value, and from the measured value, the partial pressure (0.05 Pa) of argon in the air was subtracted to obtain a calculated value. The calculated value is the amount of component remaining the chamber. The results are shown in Table 1 below. These results show that even when the getter material is left in the atmosphere for 24 hours, only performing thereafter a heat process at a low temperature in a vacuum provides the satisfactory gas adsorption property.

Example 2

A similar procedure to Example 1 was performed except that a nitrogen gas serving as an adsorption component was caused to flow into a chamber to produce a getter material, and then, the getter material was taken out of the chamber, was heated at 300° C. for 15 minutes in atmosphere, and was thereafter returned in the chamber. The results are shown in Table 1 below. This result shows that even when the getter material is subjected to the heat process at 300° C. in the atmosphere, only thereafter performing the heat process at a low temperature in the vacuum provides a satisfactory gas adsorption property.

Third Example

In a chamber, 0.2 g of copper ion exchanged zeolite (unheated) were placed. After the zeolite was placed, the copper ion exchanged zeolite was heated at 450° C. for 1 hour while air in the chamber was exhausted to realize a vacuum space. Thus, a retention component held by the copper ion exchanged zeolite was desorbed. After the heating, the chamber was cooled to a room temperature. After the cooling, a nitrogen gas which will be an adsorption component was caused to flow into the copper ion exchanged zeolite (the getter material body) to produce the getter material, and the getter material was taken out of the chamber.

Thereafter, the getter material and water were mixed to cause moisture to be adsorbed on the getter material, thereby producing a solution (the getter-material-containing composition) of the getter material including water as a solvent. Next, the getter-material-containing composition was dried in the atmosphere. After the drying, the getter material as a dried residue was placed in the chamber, the chamber was evacuated, and the getter material was heated again at 300° C. for 1 hour, thereby causing water and nitrogen to be desorbed from the getter material.

Cooling is then performed, and thereafter, air corresponding to 5 Pa with respect to the volume of the chamber was caused to flow into the chamber, and after the pressure was stabilized, the pressure in the chamber was measured to obtain a measured value, and from the measured value, the partial pressure (0.05 Pa) of argon in the air was subtracted to obtain a calculated value. The calculated value is the amount of component remaining the chamber. The results are shown in Table 1 below. This result shows that even when the getter material is once made into a solution, only thereafter drying and heating the getter material again at a low temperature in a vacuum provides a satisfactory gas adsorption property.

Comparative Example 1

In a chamber, 0.2 g of copper ion exchanged zeolite (unheated) left in atmosphere was placed. After the zeolite was placed, the copper ion exchanged zeolite was heated at 300° C. for 1 hour in a vacuum, thereby desorbing the retention component held by the copper ion exchanged zeolite. Cooling is then performed, and thereafter, air corresponding to 5 Pa with respect to the volume of the chamber was caused to flow into the chamber, and after the pressure was stabilized, the pressure in the chamber was measured to obtain a measured value, and from the measured value, the partial pressure (0.05 Pa) of argon in the air was subtracted to obtain a calculated value. The calculated value is the amount of component remaining the chamber.

TABLE 1

| | Desorption Condition of Retention Component | Adsorption Condition | Reheating Condition | Amount of Remaining Component (Pressure Equivalent, Pa) |
|---|---|---|---|---|
| Example 1 | 450° C., 1 hour | In atmosphere, at room temperature, 24 hours | 300° C., 1 hour | 0.02 |
| Example 2 | 450° C., 1 hour | In atmosphere, at 300° C., 15 minutes | 300° C., 1 hour | 0.01 |
| Example 3 | 450° C., 1 hour | Mixing with water, drying | 300° C., 1 hour | 0.04 |
| Comparative Example 1 | — | Left in atmosphere | 300° C., 1 hour | 0.45 |

<Evaluation of Copper Ion Exchanged Zeolite>

While the unheated copper ion exchanged zeolite was warmed, each retention component was desorbed. At this time, a temperature rise desorption gas mass analysis detected a relationship between the temperature of the copper ion exchanged zeolite and the intensity of each retention component desorbed. A result of the detection is shown in FIGS. 9A to 9D. In FIGS. 9A to 9D, results of oxygen, water, nitrogen, and carbon dioxide of the retention component desorbed are shown respectively. The result shows that water, nitrogen, and carbon dioxide each have a peak of the desorption a about 100° C., but oxygen has a peak of the desorption at about 400° C., and the desorption of the oxygen is less likely to occur if a high temperature process is not performed.

Manufacturing Example 1 to 2, Reference Manufacturing Example 1 to 2

Manufacturing Examples 1 to 2 and Reference Manufacturing Examples 1 to 2 of glass panel units are performed by adopting members described below.
First glass pane (the size of glass pane; width×length× thickness=300 mm×300 mm×3 mm, Low-E glass emittance=0.04),
Second glass pane (size of glass pane; width×length× thickness=300 mm×300 mm×3 mm),
Spacer (size; diameter×height=0.5 mm×0.1 mm, made of a resin).
Solvent; water,
Heat-fusible sealing material A; vanadium-based glass frit,
Heat-fusible sealing material B; bismuth-based glass frit.

Manufacturing Example 1

In a chamber, copper ion exchanged zeolite (unheated) was placed. After the copper ion exchanged zeolite was placed, the copper ion exchanged zeolite was heated at 500° C. for 4 hours while air in the chamber was exhausted to realize a vacuum space. Thus, a retention component held by the copper ion exchanged zeolite was desorbed. After the heating, the chamber was cooled to a room temperature. After the cooling, a nitrogen gas serving as an adsorption component with respect to the copper ion exchanged zeolite was caused to flow into the chamber, thereby adjusting the atmospheric pressure in the chamber to the atmospheric pressure. In this way, a getter material was produced.

Next, the getter material was mixed with water, thereby producing a getter-material-containing composition.

Thereafter, on one surface of the second glass pane having an evacuation port, a frame body made of a heat-fusible sealing material A, a partition made of the heat-fusible sealing material A, an air passage, a gas adsorbent, and a plurality of spacers were formed, and then, the first glass pane was disposed to face the second glass pane. Thus, a preassembled component having an internal space formed between first glass pane and the second glass pane was obtained. To provide the gas adsorbent, the getter-material-containing composition was applied onto the second glass pane such that the usage amount of the getter material is 0.1 g. Moreover, to provide the spacers, a plurality of spacers were arranged on the second glass pane with a dispenser such that the distance between the adjacent spacers is 20 mm.

Subsequently, the vacuum pump and the evacuation port were connected to each other via the exhaust pipe and the seal head, and then, the preassembled component was placed in a melting furnace. After the preassembled component was placed, the preassembled component was heated at 280° C. (first melting temperature) for 15 minutes to once melt the glass frit in the frame body. During the melting of the glass frit, the air passage was not closed.

After the frame body was melted, the temperature in the melting furnace was reduced to 250° C. which is the exhaust temperature. Then, the vacuum pump was operated to exhaust air in the internal space at 250° C. for 120 minutes.

Thereafter, while the vacuum pump was kept operating, the temperature in the melting furnace was increased to 290° C. which is the second melting temperature, and at this temperature, the preassembled component was heated for 15 minutes. This heating deforms the partition, thereby forming a partition wall closing the air passage.

After the partition wall was formed, the temperature in the melting furnace was reduced to a room temperature. After the reduction of the temperature, the vacuum pump was stopped, and the seal head was detached. After the detachment of the seal head, unnecessary portion was removed by cutting, thereby producing the glass panel unit.

Manufacturing Example 2

A glass panel unit was produced in a similar manner to Manufacturing Example 1 except that when the gas adsorbent was provided, the getter-material-containing composition was applied to the second glass pane such that the usage amount of the getter material is 0.5 g.

Reference Manufacturing Example 1

First, unheated copper ion exchanged zeolite was mixed with a solvent, thereby producing a getter-material-containing composition.

Thereafter, on one surface of the second glass pane having an evacuation port, a frame body made of a heat-fusible sealing material B, a partition made of the heat-fusible sealing material B, an air passage, a gas adsorbent, and a plurality of spacers were formed, and then, the first glass pane was disposed to face the second glass pane, Thus, a preassembled component having an internal space formed between first glass pane and the second glass pane was obtained. To provide the gas adsorbent, the getter-material-containing composition was applied onto the second glass pane such that the usage amount of the getter material is 0.1 g. Moreover, to provide the spacers, a plurality of spacers were arranged on the second glass pane with a dispenser such that the distance between the adjacent spacers is 20 mm.

Subsequently, the vacuum pump and the evacuation port were connected to each other via the exhaust pipe and the seal head, and then, the preassembled component was placed in a melting furnace. After the preassembled component was placed, the preassembled component was heated at 450° C. (first melting temperature) for 10 minutes to once melt the glass frit in the frame body. During the melting of the glass frit, the air passage was not closed.

After the frame body was melted, the temperature in the melting furnace was reduced to 400° C. which is the exhaust temperature. Then, the vacuum pump was operated to exhaust air in the internal space at 400° C. for 120 minutes.

Thereafter, while the vacuum pump was kept operating, the temperature in the melting furnace was increased to 460° C. which is the second melting temperature, and at this temperature, the preassembled component was heated for 30 minutes. This heating deforms the partition, thereby forming a partition wall closing the air passage.

After the partition wall was formed, the temperature in the melting furnace was reduced to a room temperature. After the reduction of the temperature, the vacuum pump was stopped, and the seal head was detached. After the detachment of the seal head, unnecessary portion was removed by cutting, thereby producing the glass panel unit.

Reference Manufacturing Example 2

A glass panel unit was produced in a similar manner to Reference Manufacturing Example 1 except that to provide a frame body and a partition, a heat-fusible sealing material A was used, the first melting temperature was 280° C., the exhaust temperature was 250° C., and the second melting temperature was 290° C.

(Evaluation)
[Thermal Conductance]

The thermal conductance of the glass panel unit of each of Manufacturing Example and Reference Manufacturing Example was evaluated based on the following procedure. A state where a high temperature part and a low temperature part of a measurement device are partitioned by a glass panel unit was achieved, a first temperature gauge was disposed on an outer surface of the first glass pane, and a second temperature gauge and a sensor were disposed on an outer surface of the second glass pane. After the gauges were disposed, heat flux transmitted from a warming part to a cooling part via the glass panel unit was detected by the sensor, a surface temperature of the first glass pane was measured with the first temperature gauge, and a surface temperature of the second glass pane 2 was measured by the second temperature gauge.

Then, the heat flux, the surface temperature of the first glass pane, and the surface temperature of the second glass pane were introduced into the following formula (1) to calculate the thermal conductance of the glass panel unit.

$$Q=C(T1-T2) \qquad (1)$$

In the formula (1), Q is the heat flux (W/m$^2$), T1 is the surface temperature (K) of the first glass pane, T2 is the surface temperature (K) of the second glass pane, and C is the thermal conductance (W/m$^2$K).

The thermal conductance of Manufacturing Example 1 was 5.0 W/m$^2$K, the thermal conductance of Manufacturing Example 2 was 0.8 W/m$^2$K, the thermal conductance of Reference Manufacturing Example 1 was 0.8 W/m$^2$K, and the thermal conductance of Reference Manufacturing Example 2 was 31 W/m$^2$K.

The above-described results provide a tendency that the first and second melting temperatures were relatively low temperatures in Manufacturing Examples 1 and 2, but the thermal conductance easily decreases. Moreover, Reference Manufacturing Example 1 also provides the tendency that the thermal conductance is likely to be reduced, but this is probably because the first and the second melting temperatures were higher than or equal to 450° C., and therefore, the retention component held by the unheated copper ion exchanged zeolite at this temperature was vaporized and exhausted in the exhaust step. From the result of Reference Manufacturing Example 1, it is assumed that when the unheated getter material is used, the heating temperature of the preassembled component is increased to a vaporization temperature of the retention component, and the heating temperature may damage elements in the preassembled component. Moreover, Reference Manufacturing Example 2 provides a tendency that the thermal conductance is less likely to be reduced. The result of Reference Manufacturing Example 2 shows that to reduce the thermal conductance, the usage amount of the unheated getter material tends to increase.

(Summary)

As described above, a first aspect is a method for manufacturing a glass panel unit (10), the method including: a step of producing a getter material (1) by heating an unprocessed getter material (1a) at a temperature higher than a prescribed temperature (Te); and a step of producing a preassembled component (100). The preassembled component (100) includes a first glass pane (200), a second glass pane (300), a heat-fusible sealing material (410) having a frame shape; an internal space (500), a gas adsorbent (60), and an evacuation port (700). The second glass pane (300) is disposed to face the first glass pane (200). The heat-fusible sealing material (410) having the frame shape is disposed between the first glass pane (200) and the second glass pane (300) and is in contact with the first glass pane (200) and the second glass pane (300). The gas adsorbent (60) contains the getter material (1) and is disposed in the internal space (500). The evacuation port (700) connects the internal space (500) to the outside space. The method of the first aspect further includes a step of forming a frame body (411) hermetically bonding the first glass pane (200) and the second glass pane (300) together by melting the heat-fusible sealing material (410) having the frame shape with heat. The manufacturing method of the first aspect further includes a step of heating the gas adsorbent (60) at the prescribed temperature (Te) while the internal space (500) is evacuated by exhausting air through the evacuation port (700).

According to the first aspect, the gas adsorbent (60) contains the getter material (1), and therefore, the usage amount of the getter material (1) is reduced, and the gettering ability is realizable at a relatively low temperature which is less likely to cause damage on elements in the vicinity of the getter material 1.

A second aspect is a method for manufacturing the glass panel unit (10) of the first aspect, wherein the preassembled component (100) further includes a partition (420) and an air passage (600). The partition (420) divides the internal space (500) into a first space (510) and a second space (520) having the evacuation port (700). The air passage (600) connects the first space (510) to the second space (520). The method of the second aspect further includes a step of deforming the partition (420) at a temperature higher than the prescribed temperature (Te) to form a partition wall (42) closing the air passage (600) and dividing the first space (510) from the second space (520) by the partition wall (42). In this step, the internal space (500) is evacuated by exhausting air in the internal space (500) through the evacuation port (700) after heating the gas adsorbent (60).

According to the second aspect, also when the partition (420) is deformed at a temperature higher than the prescribed temperature (Te), the degree of vacuum is suppressed from being deteriorated in the vacuum space (50) at a portion corresponding to the first space (510). That is, the usage amount of the getter material (1) in the vacuum space (50) is reduced, and the gettering ability is realizable at a relatively low temperature which is less likely to cause damage on elements in the vicinity of the getter material 1.

A third aspect is a method for manufacturing the glass panel unit (10) of the first or second aspect, wherein the unprocessed getter material (1*a*) is heated in an atmosphere of an inert gas containing at least one kind selected from the group consisting of neon, xenon, and argon or in an evacuated state.

The third aspect enables the usage amount of the getter material (1) to be reduced, and the gettering ability is realizable at a relatively low temperature which is less likely to cause damage on elements in the vicinity of the getter material 1.

A fourth aspect is a method for manufacturing a getter material (1), the method including generating a body (2) of the unprocessed getter material (1*a*) as a solid residue by vaporization and desorption of a retention component (5) held by the unprocessed getter material (1*a*) by heating the retention component. The method further includes, after the desorption of the retention component (5), producing a getter material (1) by causing the body (2) to adsorb an adsorption component (3) having bond energy for bonding to the body (2), the bond energy being lower than a prescribed temperature when converted into temperature. The getter material (1) is configured to, after by vaporization and desorption of the adsorption component (3) at a temperature higher than or equal to the bond energy converted into the temperature, at least adsorb a gas component different from the adsorption component (3).

According to the fourth aspect, the usage amount of the getter material (1) is reduced, and the gettering ability of the getter material (1) is realizable at a relatively low temperature which causes less damage on elements in the vicinity of the getter material (1).

A fifth aspect is a method for manufacturing a getter material (1) of a variation of the fourth aspect, the method including generating a body (2) of the unprocessed getter material (1*a*) as a solid residue by vaporization and desorption of a retention component (5) held by the unprocessed getter material (1*a*) while the retention component is heated in an atmosphere of an inert gas or under an evacuated state. The method further includes, after the desorption of the retention component (5), producing a getter material (1) by causing the body (2) to adsorb an adsorption component (3) having bond energy for bonding to the body (2), the bond energy being lower than a prescribed temperature when converted into temperature. The getter material (1) is configured to, after vaporization and desorption of the adsorption component (3) at a temperature higher than or equal to the bond energy converted into the temperature, at least adsorb a gas component different from the adsorption component (3).

According to the fifth aspect, the usage amount of the getter material (1) is reduced, and the gettering ability of the getter material (1) is realizable at a relatively low temperature which causes less damage on elements in the vicinity of the getter material (1).

A sixth aspect is a method for manufacturing a getter material (1) of the fourth or fifth aspect, the method including the adsorption component (3) includes at least one kind of component selected from the group consisting of nitrogen, hydrogen, carbon dioxide, water, neon, xenon, carbon hydride, and carbon hydride derivative.

According to the sixth aspect, the usage amount of the getter material (1) is reduced, and the gettering ability of the getter material (1) is realizable at a relatively low temperature which causes less damage on elements in the vicinity of the getter material (1).

A seventh aspect is a method for manufacturing the getter material (1) of any one of the fourth to sixth aspects, wherein the body (2) is zeolite or copper ion exchanged zeolite.

According to the seventh aspect, the usage amount of the getter material (1) is reduced, and the gettering ability of the getter material (1) is realizable at a relatively low temperature which causes less damage on elements in the vicinity of the getter material (1).

An eighth aspect is a method for manufacturing a getter-material-containing composition (1*b*), including mixing a getter material with a solvent. The getter material is the getter material (1) produced by the method of any one of the fourth to seventh aspect.

According to the eighth aspect, a getter-material-containing composition (1*b*) is obtained, wherein the usage amount of the getter material (1) is reduced, and the gettering ability is realizable at a relatively low temperature which is less likely to damage elements in the periphery of the getter material (1).

A ninth aspect is a getter material (1) including an adsorption component (3) and a body (2). The adsorption component (3) is adsorbed on the body (2). The adsorption component (3) is adsorbed on the body (2) having bond energy, and the bond energy is lower than or equal to the prescribed temperature when converted into temperature. The getter material (1) is configured to, after vaporization and desorption of the adsorption component (3) at a temperature higher than or equal to the bond energy converted into the temperature, at least adsorb a gas component different from the adsorption component (3).

The ninth aspect enables the usage amount of the getter material (1) to be reduced, and the gettering ability is realizable at a relatively low temperature which is less likely to cause damage on elements in the vicinity of the getter material 1.

A tenth aspect is the getter material (1) of the ninth aspect further containing a second adsorption component (4). The adsorption component (3) is a first adsorption component. The second adsorption component (4) is adsorbed on the body (2) by bond energy, the bond energy being higher than a prescribed temperature when converted into the temperature. The getter material (1) contains the first adsorption component (3) whose content is greater than a content of the second adsorption component (4).

According to the tenth aspect, the second adsorption component (4) is adsorbed as a minor component on the body (2), and therefore, the usage amount of the getter material (1) to be reduced, and the gettering ability is realizable at a relatively low temperature which is less likely to cause damage on elements in the vicinity of the getter material 1.

An eleventh aspect is the getter material (1) of the ninth or tenth aspect, wherein the body (2) is a solid residue resulting from vaporization and desorption of the retention component (5) held by the unprocessed getter material (1*a*).

The eleventh aspect enables the usage amount of the getter material (1) to be reduced, and the gettering ability is realizable at a relatively low temperature which is less likely to cause damage on elements in the vicinity of the getter material 1.

A twelfth aspect is the getter material (1) of any one of the ninth to eleventh aspects, wherein, the adsorption component (3) includes at least one kind of component selected from the group consisting of nitrogen, hydrogen, carbon dioxide, water, neon, xenon, carbon hydride, and carbon hydride derivative.

The twelfth aspect enables the usage amount of the getter material (1) to be reduced, and the gettering ability is realizable at a relatively low temperature which is less likely to cause damage on elements in the vicinity of the getter material 1.

A thirteenth aspect is the getter material (1) of any one of the ninth to twelfth aspects, wherein the body (2) is zeolite or copper ion exchanged zeolite.

The thirteenth aspect enables the usage amount of the getter material (1) to be reduced, and the gettering ability is realizable at a relatively low temperature which is less likely to cause damage on elements in the vicinity of the getter material 1.

A fourteenth aspect is a method for manufacturing a getter-material-containing composition (1*b*), including mixing a getter material with a solvent, the getter material (1) being produced by the method of any one of the ninth to thirteenth aspect.

According to the fourteenth aspect, a getter-material-containing composition (1*b*) is obtained, wherein the usage amount of the getter material (1) is reduced, and the gettering ability is realizable at a relatively low temperature which is less likely to damage elements in the periphery of the getter material (1).

REFERENCE SIGNS LIST

1 GETTER MATERIAL
1A UNPROCESSED GETTER MATERIAL
2 BODY (GETTER MATERIAL BODY)
3 ADSORPTION COMPONENT
10 GLASS PANEL UNIT
100 PREASSEMBLED COMPONENT
200 FIRST GLASS PANE
300 SECOND GLASS PANE
410 HEAT-FUSIBLE SEALING MATERIAL HAVING FRAME SHAPE
411 FRAME BODY
500 INTERNAL SPACE
60 GAS ADSORBENT
700 EVACUATION PORT
Te PRESCRIBED TEMPERATURE

The invention claimed is:

1. A method for manufacturing glass panel unit, the method comprising:
a step of producing a getter material including
a step of preparing an unprocessed getter material in which a retention component is held by a getter material body, the retention component being oxygen,
a step of generating the getter material body by heating the unprocessed getter material at a first temperature to vaporize and desorb the retention component from the getter material body,
a step of producing the getter material by causing an adsorption component to be adsorbed on the getter material body, the getter material including the getter material body and the adsorption component adsorbed on the getter material body,
the adsorption component being at least one component selected from the group consisting of nitrogen, hydrogen, carbon dioxide, water, neon, xenon, carbon hydride, and carbon hydride derivative;
a step of producing a preassembled component including
a first glass pane,
a second glass pane facing the first glass pane,
a heat-fusible sealing material disposed between the first glass pane and the second glass pane, being in contact with the first glass pane and the second glass pane, and having a frame shape,
an internal space surrounded by the first glass pane, the second glass pane, and the heat-fusible sealing material having the frame shape,
a gas adsorbent containing the getter material and disposed in the internal space, and
an evacuation port connecting the internal space to an outside space;
a step of forming a frame body by melting the heat-fusible sealing material with heat and then hardening the heat-fusible sealing material to form the frame body, wherein the frame body hermetically bonds the first glass pane and the second glass pane together; and
a step of heating the gas adsorbent at a second temperature lower than the first temperature while the internal space is evacuated by exhausting air in the internal space through the evacuation port.

2. The method of claim 1, wherein
the preassembled component further includes
- a partition dividing the internal space into a first space and a second space having the evacuation port; and
- an air passage connecting the first space to the second space, and the method further includes a step of, after the gas adsorbent is heated, deforming the partition at a temperature higher than the second temperature to form a partition wall closing the air passage while the internal space is evacuated by exhausting the air through the evacuation port, and defining the first space and the second space by the partition wall.

3. The method of claim 1, wherein
the unprocessed getter material is heated in an atmosphere of an inert gas containing at least one component selected from the group consisting of neon, xenon, and argon or in an evacuated state.

\* \* \* \* \*